United States Patent
Du et al.

(10) Patent No.: US 9,825,328 B2
(45) Date of Patent: Nov. 21, 2017

(54) IONICALLY CONDUCTIVE COMPOUNDS AND RELATED USES

(71) Applicants: Sion Power Corporation, Tucson, AZ (US); BASF SE, Ludwigshafen (DE)

(72) Inventors: Hui Du, Tucson, AZ (US); Tracy Earl Kelley, Tucson, AZ (US); Chariclea Scordilis-Kelley, Tucson, AZ (US); Holger Schneider, Ludwigshafen (DE); Klaus Leitner, Ludwigshafen (DE); Joern Kulisch, Eppelheim (DE); Marina Safont-Sempere, Ludwigshafen (DE); Johan ter Maat, Mannheim (DE)

(73) Assignees: Sion Power Corporation, Tucson, AZ (US); BASF SE, Ludwigshafen (DE)

( * ) Notice: Subject to any disclaimer, the term of this patent is extended or adjusted under 35 U.S.C. 154(b) by 0 days.

(21) Appl. No.: 15/343,635

(22) Filed: Nov. 4, 2016

(65) Prior Publication Data

US 2017/0149086 A1    May 25, 2017

Related U.S. Application Data

(60) Provisional application No. 62/259,449, filed on Nov. 24, 2015.

(51) Int. Cl.
  *H01M 10/0562* (2010.01)
  *H01M 10/0525* (2010.01)
  *H01M 2/16* (2006.01)

(52) U.S. Cl.
  CPC ..... *H01M 10/0562* (2013.01); *H01M 2/1646* (2013.01); *H01M 10/0525* (2013.01); *H01M 2300/0068* (2013.01)

(58) Field of Classification Search
  None
  See application file for complete search history.

(56) References Cited

U.S. PATENT DOCUMENTS

| 4,664,991 A | 5/1987 | Perichaud et al. |
| 4,739,018 A | 4/1988 | Armand et al. |

(Continued)

FOREIGN PATENT DOCUMENTS

| JP | 08-148163 A | 6/1996 |
| JP | 2007-018861 A | 1/2007 |

(Continued)

OTHER PUBLICATIONS

International Search Report and Written Opinion for PCT/US2016/060503 dated Mar. 6, 2017.

(Continued)

*Primary Examiner* — Sarah A. Slifka
(74) *Attorney, Agent, or Firm* — Wolf, Greenfield & Sacks, P.C.

(57) ABSTRACT

Articles, compositions, and methods involving ionically conductive compounds are provided. The disclosed ionically conductive compounds may be incorporated into an electrochemical cell (e.g., a lithium-sulfur electrochemical cell, a lithium-ion electrochemical cell, an intercalated-cathode based electrochemical cell) as, for example, a protective layer for an electrode, a solid electrolyte layer, and/or any other appropriate component within the electrochemical cell. In certain embodiments, electrode structures and/or methods for making electrode structures including a layer comprising an ionically conductive compound described herein are provided.

19 Claims, 11 Drawing Sheets

(56) References Cited

U.S. PATENT DOCUMENTS

| | | |
|---|---|---|
| 4,833,048 A | 5/1989 | DeJonghe et al. |
| 4,917,974 A | 4/1990 | DeJonghe et al. |
| 4,954,371 A | 9/1990 | Yializis |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,681,615 A | 10/1997 | Affinito et al. |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,853,917 A | 12/1998 | Fauteux et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,153,337 A | 11/2000 | Carlson et al. |
| 6,201,100 B1 | 3/2001 | Gorkovenko et al. |
| 6,214,061 B1 | 4/2001 | Visco et al. |
| 6,238,821 B1 | 5/2001 | Mukherjee et al. |
| 6,306,545 B1 | 10/2001 | Carlson et al. |
| 6,413,284 B1 | 7/2002 | Chu et al. |
| 6,413,285 B1 | 7/2002 | Chu et al. |
| 6,432,584 B1 | 8/2002 | Visco et al. |
| 6,733,924 B1 | 5/2004 | Skotheim et al. |
| 6,737,197 B2 | 5/2004 | Chu et al. |
| 6,797,428 B1 | 9/2004 | Skotheim et al. |
| 6,936,381 B2 | 8/2005 | Skotheim et al. |
| 7,070,632 B1 | 7/2006 | Visco et al. |
| 7,160,603 B2 | 1/2007 | Carlson |
| 7,175,937 B2 | 2/2007 | Cho et al. |
| 7,247,408 B2 | 7/2007 | Skotheim et al. |
| 7,432,017 B2 | 10/2008 | Visco et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,075,865 B2 | 12/2011 | Deiseroth et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,114,171 B2 | 2/2012 | Visco et al. |
| 8,182,943 B2 | 5/2012 | Visco et al. |
| 8,197,971 B2 | 6/2012 | Skotheim et al. |
| 8,202,649 B2 | 6/2012 | Visco et al. |
| 8,264,205 B2 | 9/2012 | Kopera |
| 8,334,075 B2 | 12/2012 | Visco et al. |
| 8,338,034 B2 | 12/2012 | Affinito et al. |
| 8,383,268 B2 | 2/2013 | Inda |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 2002/0012846 A1 | 1/2002 | Skotheim et al. |
| 2002/0192562 A1 | 12/2002 | Ferreira et al. |
| 2005/0008938 A1 | 1/2005 | Cho et al. |
| 2005/0095504 A1 | 5/2005 | Kim et al. |
| 2005/0186469 A1 | 8/2005 | De Jonghe et al. |
| 2005/0196672 A1 | 9/2005 | Mukherjee et al. |
| 2006/0115579 A1 | 6/2006 | Mukherjee et al. |
| 2006/0121345 A1 | 6/2006 | Yasuda et al. |
| 2006/0147801 A1 | 7/2006 | Yasuda et al. |
| 2006/0147802 A1 | 7/2006 | Yasuda et al. |
| 2006/0222954 A1 | 10/2006 | Skotheim et al. |
| 2006/0238203 A1 | 10/2006 | Kelley et al. |
| 2007/0221265 A1 | 9/2007 | Affinito et al. |
| 2007/0224502 A1 | 9/2007 | Affinito et al. |
| 2008/0014501 A1 | 1/2008 | Skotheim et al. |
| 2008/0057397 A1 | 3/2008 | Skotheim et al. |
| 2008/0187663 A1 | 8/2008 | Affinito |
| 2008/0213672 A1 | 9/2008 | Skotheim et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2009/0071835 A1 | 3/2009 | De Jonghe et al. |
| 2009/0136830 A1 | 5/2009 | Gordon et al. |
| 2009/0200986 A1 | 8/2009 | Kopera |
| 2009/0291353 A1 | 11/2009 | Affinito et al. |
| 2009/0297935 A1 | 12/2009 | Visco et al. |
| 2010/0035128 A1 | 2/2010 | Scordilis-Kelley et al. |
| 2010/0129699 A1 | 5/2010 | Mikhaylik et al. |
| 2010/0239914 A1 | 9/2010 | Mikhaylik et al. |
| 2010/0291442 A1 | 11/2010 | Wang et al. |
| 2010/0327811 A1 | 12/2010 | Affinito et al. |
| 2011/0006738 A1 | 1/2011 | Mikhaylik et al. |
| 2011/0008531 A1 | 1/2011 | Mikhaylik et al. |
| 2011/0014524 A1 | 1/2011 | Skotheim et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0043940 A1 | 2/2012 | Affinito et al. |
| 2012/0048729 A1 | 3/2012 | Mikhaylik et al. |
| 2012/0052339 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2012/0219842 A1 | 8/2012 | Visco et al. |
| 2012/0270112 A1 | 10/2012 | Visco et al. |
| 2012/0276449 A1 | 11/2012 | Skotheim et al. |
| 2013/0017441 A1 | 1/2013 | Affinito et al. |
| 2013/0040208 A1 | 2/2013 | Kanno et al. |
| 2013/0095380 A1 | 4/2013 | Affinito et al. |
| 2013/0143096 A1 | 6/2013 | Affinito et al. |
| 2013/0164635 A1 | 6/2013 | Schmidt et al. |
| 2013/0216915 A1 | 8/2013 | Affinito et al. |
| 2013/0224601 A1 | 8/2013 | Burnside et al. |
| 2013/0252103 A1 | 9/2013 | Mikhaylik et al. |
| 2013/0280605 A1 | 10/2013 | Affinito et al. |
| 2013/0316072 A1 | 11/2013 | Scordilis-Kelley et al. |
| 2014/0045075 A1 | 2/2014 | Skotheim et al. |
| 2014/0062411 A1 | 3/2014 | Mikhaylik et al. |
| 2014/0065513 A1 | 3/2014 | Badding et al. |
| 2014/0072873 A1 | 3/2014 | Wang et al. |
| 2014/0079994 A1 | 3/2014 | Affinito et al. |
| 2014/0123477 A1 | 5/2014 | Safont Sempere et al. |

(56) References Cited

U.S. PATENT DOCUMENTS

| | | |
|---|---|---|
| 2014/0127419 A1 | 5/2014 | Fleischmann et al. |
| 2014/0127577 A1 | 5/2014 | Fleischmann et al. |
| 2014/0193723 A1 | 7/2014 | Kumaresan et al. |
| 2014/0205912 A1 | 7/2014 | Skotheim et al. |
| 2014/0220439 A1 | 8/2014 | Badding et al. |
| 2014/0272565 A1 | 9/2014 | Gronwald et al. |
| 2014/0272594 A1 | 9/2014 | Safont et al. |
| 2014/0272595 A1 | 9/2014 | Cristadoro et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0180084 A1 | 6/2015 | Scordilis-Kelley et al. |
| 2015/0188194 A1 | 7/2015 | Mikhaylik et al. |
| 2015/0200421 A1 | 7/2015 | Homma et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0287998 A1 | 10/2015 | Scordilis-Kelley et al. |
| 2015/0318539 A1 | 11/2015 | Kelley et al. |
| 2015/0318552 A1 | 11/2015 | Skotheim et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2016/0344067 A1 | 11/2016 | Laramie et al. |
| 2017/0018815 A1 | 1/2017 | Laramie et al. |
| 2017/0047590 A1 | 2/2017 | Mikhaylik et al. |
| 2017/0141385 A1 | 5/2017 | Scordilis-Kelley et al. |
| 2017/0141402 A1 | 5/2017 | Affinito et al. |
| 2017/0141442 A1 | 5/2017 | Mikhaylik et al. |

FOREIGN PATENT DOCUMENTS

| | | |
|---|---|---|
| JP | 2007-273214 A | 10/2007 |
| JP | 2013-137889 A | 7/2013 |
| JP | 2013-137889 A2 | 7/2013 |
| WO | WO 99/33125 A1 | 7/1999 |
| WO | WO 99/33130 A1 | 7/1999 |
| WO | WO 2014/035753 A1 | 3/2014 |
| WO | WO 2015/110333 A1 | 7/2015 |

OTHER PUBLICATIONS

Kamaya et al., A lithium supertonic conductor. Nat Mater. Jul. 31, 2011;10(9):682-6. doi: 10.1038/nmat3066.

Kanno et al., Lithium Ionic Conductor Thio-LISICON the Li2S-GeS2-P2S 5 System. Journal of the Electrochemical Society. 2001;148(7):A742-6.

Extended European Search Report for EP 16197405.0 dated Apr. 7, 2017.

Alamgir et al., Lithium Batteries, New Materials, Developments and Perspectives, Chapter 3. Elsevier, Amsterdam. 1994; 93-136.

Boulineau et al., Mechanochemical synthesis of Li-argyrodite Li6PS5X (X=Cl, Br, I) as sulfur-based solid electrolytes for all solid state batteries application. Solid State Ionics. Aug. 3, 2012;221:1-5.

Bron et al., Li10SnP2S12: an affordable lithium supertonic conductor. J Am Chem Soc. Oct. 23, 2013;135(42):15694-7. doi: 10.1021/ja407393y.

Chen et al., Stability and ionic mobility in argyrodite-related lithium-ion solid electrolytes. Phys Chem Chem Phys. Jul. 7, 2015;17(25):16494-506. doi: 10.1039/c5cp01841b. Epub Jun. 8, 2015.

Coelho, Topas-Academic, Version 6. Technical Reference. Sep. 8, 2016. Bruker AXS. Karlsruhe, Germany. 208 pages.

De Klerk et al., Diffusion Mechanism of Li Argyrodite Solid Electrolytes for Li-Ion Batteries and Prediction of Optimized Halogen Doping: The Effect of Li Vacancies, Halogens, and Halogen Disorder. Chem. Mater. 2016;28:7955-63.

Deiseroth et al., $Li_7PS_6$ and $Li_6PS_5X$ (X: Cl, Br, I): Possible Three-dimensional Diffusion Pathways for Lithium Ions and Temperature Dependence of the Ionic Conductivity by Impedance Measurements. Zeitschrift fuer anorganische and allgemeine Chemie. Aug. 2011;637(10):1287-94.

Dominey, Lithium Batteries, New Materials, Developments and Perspectives, Chapter 4. Elsevier, Amsterdam. 1994; 137-165.

Frank et al., Synthesis and Crystal Structure Determination of $Ag_9FeS_{4.1}Te_{1.9}$, the First Example of an Iron Containing Argyrodite. Chem. Mater. 2013;25(11):2339-45.

Hayashi et al., Invited Paper: Recent Development of Bulk-Type Solid-State Rechargeable Lithium Batteries with Sulfide Glass-ceramic Electrolytes. Electronic Materials Letters. Apr. 2012;8(2):199-207.

Hori et al., Synthesis, structure, and ionic conductivity of solid solution, Li10+δM1+δP2-δS12 (M=Si, Sn). Faraday Discuss. 2014;176:83-94. doi: 10.1039/c4fd00143e.

Inoue et al., Spousal hematopoietic stem cell transplantation. Int. J. Hematol. May 2017;246:334-40.

Kato et al., Discharge performance of All-Solid-State Battery using a lithium Superionic Conductor Li10GeP2S12. Electrochemistry. 2012;80(10):749-51.

Kato et al., Synthesis, structure and lithium ionic conductivity of solid solutions of $Li_{10}(Ge_{1-x}M_x)P_2S_{12}$ (M=Si, Sn). Journal of Power Sources. 2014;271:60-4.

Knauth, Inorganic solid Li ion conductors: An overview. Solid State Ionics. 2009;180:911-6.

Kong et al., Structural characterisation of the Li argyrodites Li7PS6 and Li7PSe6 and their solid solutions: quantification of site preferences by MAS-NMR spectroscopy. Chemistry. May 3, 2010;16(17):5138-47. doi: 10.1002/chem.200903023.

Kuhn et al., A new ultrafast superionic Li-conductor: ion dynamics in Li11Si2PS12 and comparison with other tetragonal LGPS-type electrolytes. Phys Chem Chem Phys. Jul. 28, 2014;16(28):14669-74. doi: 10.1039/c4cp02046d.

Kuhn et al., Tetragonal $Li_{10}GeP_2S_{12}$ and $Li_7GePS_8$ —exploring the Li ion dynamics in LGPS Li electrolytes. Energy & Environmental Science. Jan. 1, 2013;6(12):3548-52.

Lin et al., Lithium Polysulfidophosphates: A Family of Lithium-Conducting Sulfur-Rich Compounds for Lithium-Sulfur Batteries. Angewandte Chem. Int. Ed. 2013;52:7460-3.

Minami et al., Preparation and characterization of superionic conducting $Li_7P_3S_{11}$ crystal from glassy liquids. Journal of the Ceramic Society of Japan. 2010;118(4):305-8.

Nuyken et al., Ring-opening polymerization—an introductory review. Polymers. 2013; 5:361-403.

Ong et al., Phase stability, electrochemical stability and ionic conductivity of the $Li_{10\pm1}MP_2X_{12}$ (M=Ge, Si, superionic conductors. Energy Environ. Sci. 2013;6:148-56.

Pecher et al., Atomistic characterisation of Li+ mobility and conductivity in Li(7-x)PS(6-x)Ix argyrodites from molecular dynamics simulations, solid-state NMR, and impedance spectroscopy. Chemistry. Jul. 26, 2010;16(28):8347-54. doi: 10.1002/chem.201000501.

Rangasamy et al., An Iodide-Based $Li_7P_2S_8I$ Superionic Conductor. J. Am. Chem. Soc. Jan. 2015;137:1384-7.

Rao et al., Synthesis and Li+ ion Migration Studies of $Li_6PS_5X$ (X=Cl, Br, I). Mater. Res. Soc. Symp. Proc. 2011;1331:6 pages.

Whiteley et al., Empowering the Lithium Metal Battery through a Silicon-Based Superionic Conductor. Journal of the Electrochemical Society. Aug. 22, 2014;161(1):A1812-7.

Zhang et al., Ultrasmall Li2S Nanoparticles Anchored in Graphene Nanosheets for High-Energy Lithium-Ion Batteries. Scientific Reports. Sep. 25, 2014;4:7 pages.

IONICALLY CONDUCTIVE COMPOUNDS AND RELATED USES

RELATED APPLICATIONS

This application claims priority to U.S. Provisional Application No. 62/259,449, filed Nov. 24, 2015, which is incorporated herein by reference in its entirety for all purposes.

FIELD

Articles, compositions, and methods including ionically conductive compounds are provided. In some embodiments, the ionically conductive compounds are useful for electrochemical cells.

BACKGROUND

Lithium compound-containing electrochemical cells and batteries including such cells are modern means for storing energy. They exceed certain conventional secondary batteries with respect to capacity and life-time and, in many times, use of toxic materials such as lead can be avoided. However, in contrast to conventional lead-based secondary batteries, various technical problems have not yet been solved.

Secondary batteries based on cathodes including lithiated metal oxides such as $LiCoO_2$, $LiMn_2O_4$, and $LiFePO_4$ are well established. However, some batteries of this type are limited in capacity. For that reason, numerous attempts have been made to improve the electrode materials. Particularly promising are so-called lithium sulfur batteries. In such batteries, lithium will be oxidized and converted to lithium sulfides such as $Li_2S_{8-a}$, a being a number in the range from zero to 7. During recharging, lithium and sulfur will be regenerated. Such secondary cells have the advantage of a high capacity.

Sulfide materials of different compositions and nature are known to be lithium-ion conductors (e.g., $Li_2S_x/P_2S_5$ glasses, $Li_2S_x/P_2S_5$-derived glass ceramics, $Li_7P_3S_{11}$, thio-LISICON, oxysulfide glasses). However, such materials may suffer from issues such as low stability against liquid organic electrolyte solutions, insufficient stability against metallic lithium or high voltage cathode materials, extreme sensitivity to moisture and/or air, and/or an intrinsically low ionic conductivity.

Accordingly, improved lithium-ion ionically conductive compounds are needed.

SUMMARY

Articles, compositions, and methods involving ionically conductive compounds are provided. In some embodiments, the ionically conductive compounds are useful for electrochemical cells.

The subject matter of the present invention involves, in some cases, interrelated products, alternative solutions to a particular problem, and/or a plurality of different uses of one or more systems and/or articles.

In one aspect, compounds are provided. In some embodiments, the compound has a composition as in formula (I):

$$Li_{2x}S_{x+w+5z}M_yP_{2z} \tag{I}$$

wherein M is selected from the group consisting of Lanthanides, Group 3, Group 4, Group 5, Group 6, Group 7, Group 8, Group 9, Group 12, Group 13, and Group 14 atoms, and combinations thereof, x is 8-16, y is 0.1-6, w is 0.1-15, and z is 0.1-3.

In certain embodiments involving the compounds described above and herein, the compound of formula (I) is crystalline. In certain embodiments involving the compounds described above and herein, the compound of formula (I) is amorphous.

In another aspect, articles for use in an electrochemical cell is provided. In some embodiments, the article comprises a compound of formula (I):

$$Li_{2x}S_{x+w+5z}M_yP_{2z} \tag{I}$$

wherein M is selected from the group consisting of Lanthanides, Group 3, Group 4, Group 5, Group 6, Group 7, Group 8, Group 9, Group 12, Group 13, and Group 14 atoms, and combinations thereof, x is 8-16, y is 0.1-6, w is 0.1-15, and z is 0.1-3. In certain embodiments involving the articles described above and herein, the article comprises a layer comprising the compound of formula (I). In certain embodiments involving the articles described above and herein, the article comprises the compound of formula (I) deposited on a layer.

In yet another aspect, methods are provided. In some embodiments, the method comprises heating a mixture of precursors comprising atoms of the elements Li, S, P, and M to a temperature ranging from 400° C. to 900° C. for a duration ranging from 3 hours to 24 hours, cooling the mixture, and forming a plurality of particles comprising a compound of formula (I):

$$Li_{2x}S_{x+w+5z}M_yP_{2z} \tag{I},$$

wherein M is selected from the group consisting of Lanthanides, Group 3, Group 4, Group 5, Group 6, Group 7, Group 8, Group 9, Group 12, Group 13, and Group 14 atoms, and combinations thereof, x is 8-16, y is 0.1-6, w is 0.1-15, and z is 0.1-3. In certain embodiments, the mixture comprises $xLi_2S$, $yMS_a$, and/or $zP_bS_c$, wherein a is 0-8, b is 0-2, and c is 0-8, such that b+c is 1 or greater.

In some embodiments, the method comprises depositing a plurality of particles comprising a compound of formula (I) on a layer:

$$Li_{2x}S_{x+w+5z}M_yP_{2z} \tag{I}$$

wherein M is selected from the group consisting of Lanthanides, Group 3, Group 4, Group 5, Group 6, Group 7, Group 8, Group 9, Group 12, Group 13, and Group 14 atoms, and combinations thereof, x is 8-16, y is 0.1-6, w is 0.1-15, and z is 0.1-3.

In certain embodiments involving the methods described above and herein, prior to heating, the mixture is mixed by ball milling. In certain embodiments involving the methods described above and herein, heating the mixture occurs at a pressure of between 0.1 MPa and 0.3 MPa. In certain embodiments involving the methods described above and herein, depositing the plurality of particles comprising the compound of formula (I) on the layer comprises aerosol deposition or vacuum deposition. In certain embodiments involving the methods described above and herein, the layer on which the particles are deposited is an electrode, a lithium metal layer, a protective layer, or a separator.

In certain embodiments involving the compounds, articles, and/or methods described above and herein, x is 10 or greater.

In certain embodiments involving the compounds, articles, and/or methods described above and herein, y is 1.

In certain embodiments involving the compounds, articles, and/or methods described above and herein, w is equal to y, 1.5y, or 2y.

In certain embodiments involving the compounds, articles, and/or methods described above and herein, z is 1.

In certain embodiments involving the compounds, articles, and/or methods described above and herein, M is selected from the group consisting of silicon, tin, germanium, zinc, iron, zirconium, aluminum, and combinations thereof.

In certain embodiments involving the compounds, articles, and/or methods described above and herein, the compound of formula (I) has a cubic structure.

In certain embodiments involving the articles and/or methods described above and herein, the article or method comprises a plurality of particles that comprise the compound of formula (I). In certain embodiments involving the articles and/or methods described above and herein, the article or method comprises a layer comprising a plurality of particles that comprise the compound of formula (I). In certain embodiments involving the articles and/or methods described above and herein, the plurality of particles have an average largest cross-sectional dimension of greater than or equal to 10 nm and less than or equal to 100 microns. In certain embodiments involving the articles and/or methods described above and herein, the plurality of particles have an average ion conductivity of greater than or equal to $10^{-4}$ S/cm.

In certain embodiments involving the articles and/or methods described above and herein, the layer comprising the compound of formula (I) is in direct contact with the electrode.

In certain embodiments involving the articles and/or methods described above and herein, the layer comprising the compound of formula (I) is a separator. In certain embodiments involving the articles and/or methods described above and herein, the layer comprising the compound of formula (I) has an average thickness of greater than or equal to 1 microns and less than or equal to 50 microns.

In certain embodiments involving the articles and/or methods described above and herein, the layer comprising the compound of formula (I) is a protective layer. In certain embodiments involving the articles and/or methods described above and herein, the layer comprising the compound of formula (I) has an average thickness of greater than or equal to 1 nanometer and less than or equal to 10 microns.

In certain embodiments involving the articles and/or methods described above and herein, the layer comprising the compound of formula (I) is a solid electrolyte layer. In certain embodiments involving the articles and/or methods described above and herein, the layer comprising the compound of formula (I) has an average thickness of greater than or equal to 50 nm and less than or equal to 25 microns.

In certain embodiments involving the articles and/or methods described above and herein, the layer comprising the compound of formula (I) is a lithium-intercalation electrode. In certain embodiments involving the articles and/or methods described above and herein, the layer comprising the compound of formula (I) has an average ion conductivity of greater than or equal to $10^{-4}$ S/cm.

In certain embodiments involving the articles and/or methods described above and herein, at least a portion of the layer comprising the compound of formula (I) is crystalline. In certain embodiments involving the articles and/or methods described above and herein, the layer comprising the compound of formula (I) is amorphous.

In yet another aspect, electrochemical cells are provided. In some embodiments, the electrochemical cell comprises an article as described above and herein. In certain embodiments involving the electrochemical cells described above and herein, the electrochemical cell comprises a liquid electrolyte, an anode comprising lithium or silicon, and/or a cathode comprising sulfur or a lithium-intercalation species.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
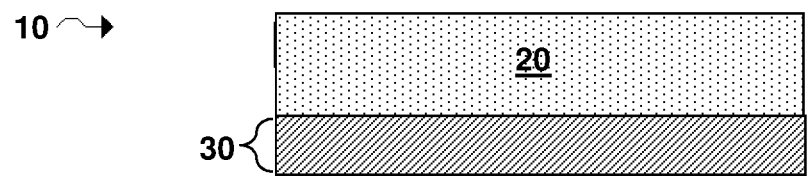
FIGS. 1A-1E are a schematics of articles incorporating ionically conductive compounds, according to some embodiments.

Articles, compositions, and methods involving ionically conductive compounds are provided. In some embodiments, the ionically conductive compounds are useful for electrochemical cells. The disclosed ionically conductive compounds may be incorporated into an electrochemical cell (e.g., a lithium-sulfur electrochemical cell, a lithium-ion electrochemical cell, an intercalated-cathode based electrochemical cell) as, for example, a protective layer for an electrode, a solid electrolyte layer, and/or any other appropriate component within the electrochemical cell. In certain embodiments, electrode structures and/or methods for making electrode structures including a layer comprising an ionically conductive compound described herein are provided.

The incorporation of ionically conductive compounds as described herein into electrochemical cells may, for example, increase the stability of an electrode (e.g., a lithium electrode) in the electrochemical cell, increase ionic conductivity, and/or may facilitate fabrication (e.g., formation of thin layers), as compared to certain existing ionically conductive compounds used in electrochemical cells. In some embodiments, the incorporation of ionically conductive compounds as described herein into electrochemical cells may prevent or reduce the occurrence of chemical reactions between a component of an electrolyte (e.g., polysulfides) and an electroactive material of an anode (e.g., an anode comprising lithium, such as metallic lithium).

Layers comprising the ionically conductive compound, as described in more detail herein, may, in some cases, selectively conduct lithium cations but not anions, and may function as a barrier (e.g., protective structure) for electrolytes (e.g., liquid electrolytes). For example, the use of the ionically conductive compounds in a protective layer (e.g., in an electrochemical cell including a liquid electrolyte) may offer several advantages over certain existing protective layers, including reduction in the consumption of lithium (e.g., lithium metal) during charge/discharge of the electrochemical cell. The protective layer may be used to substantially inhibit direct contact of an electrode (e.g., the anode, the cathode) with an electrolyte and/or a particular species present in the electrolyte. In some embodiments, the use of ionically conductive compounds described herein in solid electrolyte layers (e.g., in solid state electrochemical cells) may offer several advantages over certain existing solid electrolytes including increased ion conductivity and/or increased chemical stability.

The disclosed ionically conductive compounds may be incorporated into electrochemical cells including primary batteries or secondary batteries, which can be charged and discharged numerous times. In certain embodiments, the articles, compositions, and methods described herein can be used in association with batteries including a liquid electrolyte. However, in other embodiments, the articles, compositions, and methods described herein can be used in association with solid state batteries.

In some embodiments, the materials, systems, and methods described herein can be used in association with lithium batteries (e.g., lithium-sulfur batteries). It should be appreciated, however, that while much of the description herein relates to lithium-sulfur batteries, the ionically conductive compounds and layers comprising ionically conductive compounds described herein may be applied to other lithium-based batteries, including other alkali metal-based batteries.

The electrochemical cells described herein may be employed in various applications, for example, making or operating cars, computers, personal digital assistants, mobile telephones, watches, camcorders, digital cameras, thermometers, calculators, laptop BIOS, communication equipment or remote car locks.

In some embodiments, the ionically conductive compound has a composition as in formula (I):

$$Li_{2x}S_{x+w+5z}M_yP_{2z} \quad (I),$$

where x is 8-16, y is 0.1-6, w is 0.1-15, z is 0.1-3, and M is selected from the group consisting of Lanthanides, Group 3, Group 4, Group 5, Group 6, Group 7, Group 8, Group 9, Group 12, Group 13, and Group 14 atoms, and combinations thereof.

In some embodiments, the ionically conductive compound has a composition as in formula (I) and x is 8-16, 8-12, 10-12, 10-14, or 12-16. In some embodiments x is 8 or greater, 8.5 or greater, 9 or greater, 9.5 or greater, 10 or greater, 10.5 or greater, 11 or greater, 11.5 or greater, 12 or greater, 12.5 or greater, 13 or greater, 13.5 or greater, 14 or greater, 14.5 or greater, 15 or greater, or 15.5 or greater. In certain embodiments, x is less than or equal to 16, less than or equal to 15.5, less than or equal to 15, less than or equal to 14.5, less than or equal to 14, less than or equal to 13.5, less than or equal to 13, less than or equal to 12.5, less than or equal to 12, less than or equal to 11.5, less than or equal to 11, less than or equal to 10.5, less than or equal to 10, less than or equal to 9.5, or less than or equal to 9. Combinations of the above referenced ranges are also possible (e.g., greater than or equal to 8 and less than or equal to 16, greater than or equal to 10 and less than or equal to 12). Other ranges are also possible. In some embodiments, x is 10. In certain embodiments, x is 12.

In certain embodiments, the ionically conductive compound has a composition as in formula (I) and y is 0.1-6, 0.1-1, 0.1-3, 0.1-4.5, 0.1-6, 0.8-2, 1-4, 2-4.5, 3-6 or 1-6. For example, in some embodiments, y is 1. In some embodiments, y is greater than or equal to 0.1, greater than or equal to 0.2, greater than or equal to 0.4, greater than or equal to 0.5, greater than or equal to 0.6, greater than or equal to 0.8, greater than or equal to 1, greater than or equal to 1.2, greater than or equal to 1.4, greater than or equal to 1.5, greater than or equal to 1.6, greater than or equal to 1.8, greater than or equal to 2.0, greater than or equal to 2.2, greater than or equal to 2.4, greater than or equal to 2.5, greater than or equal to 2.6, greater than or equal to 2.8, greater than or equal to 3.0, greater than or equal to 3.5, greater than or equal to 4.0, greater than or equal to 4.5, greater than or equal to 5.0, or greater than or equal to 5.5. In certain embodiments, y is less than or equal to 6, less than or equal to 5.5, less than or equal to 5.0, less than or equal to 4.5, less than or equal to 4.0, less than or equal to 3.5, less than or equal to 3.0, less than or equal to 2.8, less than or equal to 2.6, less than or equal to 2.5, less than or equal to 2.4, less than or equal to 2.2, less than or equal to 2.0, less than or equal to 1.8, less than or equal to 1.6, less than or equal to 1.5, less than or equal to 1.4, less than or equal to 1.2, less than or equal to 1.0, less than or equal to 0.8, less than or equal to 0.6, less than or equal to 0.5, less than or equal to 0.4, or less than or equal to 0.2. Combinations of the above-referenced ranges are also possible (e.g., greater than or equal to 0.1 and less than or equal to 6.0, greater than or equal to 1 and less than or equal to 6, greater than or equal to 1 and less than or equal to 3, greater than or equal to 0.1 and less than or equal to 4.5, greater than or equal to 1.0 and less than or equal to 2.0). Other ranges are also possible. In embodiments in which a compound of formula (I) includes more than one M, the total y may have a value in one or more of the above-referenced ranges and in some embodiments may be in the range of 0.1-6.

In some embodiments, the ionically conductive compound has a composition as in formula (I) and z is 0.1-3, 0.1-1, 0.8-2, or 1-3. For example, in some embodiments, z is 1. In some embodiments, z is greater than or equal to 0.1, greater than or equal to 0.2, greater than or equal to 0.4, greater than or equal to 0.5, greater than or equal to 0.6, greater than or equal to 0.8, greater than or equal to 1, greater than or equal to 1.2, greater than or equal to 1.4, greater than or equal to 1.5, greater than or equal to 1.6, greater than or equal to 1.8, greater than or equal to 2.0, greater than or equal to 2.2, greater than or equal to 2.4, greater than or equal to 2.5, greater than or equal to 2.6, or greater than or equal to 2.8. In certain embodiments, z is less than or equal to 3.0, less than or equal to 2.8, less than or equal to 2.6, less than or equal to 2.5, less than or equal to 2.4, less than or equal to 2.2, less than or equal to 2.0, less than or equal to 1.8, less than or equal to 1.6, less than or equal to 1.5, less than or equal to 1.4, less than or equal to 1.2, less than or equal to 1.0, less than or equal to 0.8, less than or equal to 0.6, less than or equal to 0.5, less than or equal to 0.4, or less than or equal to 0.2. Combinations of the above-referenced ranges are also possible (e.g., greater than or equal to 0.1 and less than or equal to 3.0, greater than or equal to 1.0 and less than or equal to 2.0). Other ranges are also possible.

In certain embodiments, the ratio of y to z is greater than or equal to 0.03, greater than or equal to 0.1, greater than or equal to 0.25, greater than or equal to 0.5, greater than or equal to 0.75, greater than or equal to 1, greater than or equal to 2, greater than or equal to 4, greater than or equal to 8, greater than or equal to 10, greater than or equal to 15, greater than or equal to 20, greater than or equal to 25, greater than or equal to 30, greater than or equal to 40, greater than or equal to 45, or greater than or equal to 50. In some embodiments, the ratio of y to z is less than or equal to 60, less than or equal to 50, less than or equal to 45, less than or equal to 40, less than or equal to 30, less than or equal to 25, less than or equal to 20, less than or equal to 15, less than or equal to 10, less than or equal to 8, less than or equal to 4, less than or equal to 3, less than or equal to 2, less than or equal to 1, less than or equal to 0.75, less than or equal to 0.5, less than or equal to 0.25, or less than or equal to 0.1. Combinations of the above-referenced ranges are also possible (e.g., a ratio of y to z of greater than or equal to 0.1 and less than or equal to 60, a ratio of y to z of greater than or equal to 0.1 and less than or equal to 10, greater than or equal to 0.25 and less than or equal to 4, or greater than or equal to 0.75 and less than or equal to 2). In some embodiments, the ratio of y to z is 1.

In some embodiments, the ionically conductive compound has a composition as in formula (I) and w is 0.1-15, 0.1-1, 0.8-2, 1-3, 1.5-3.5, 2-4, 2.5-5, 3-6, 4-8, 6-10, 8-12, or 10-15. For example, in some embodiments, w is 1. In some cases, w may be 1.5. In certain embodiments, w is 2. In some embodiments, w is greater than or equal to 0.1, greater than or equal to 0.2, greater than or equal to 0.4, greater than or equal to 0.5, greater than or equal to 0.6, greater than or equal to 0.8, greater than or equal to 1, greater than or equal to 1.5, greater than or equal to 2, greater than or equal to 2.5, greater than or equal to 3, greater than or equal to 4, greater than or equal to 6, greater than or equal to 8, greater than or equal to 10, greater than or equal to 12, or greater than or equal to 14. In certain embodiments, w is less than or equal to 15, less than or equal to 14, less than or equal to 12, less than or equal to 10, less than or equal to 8, less than or equal to 6, less than or equal to 4, less than or equal to 3, less than or equal to 2.5, less than or equal to 2, less than or equal to 1.5, less than or equal to 1, less than or equal to 0.8, less than or equal to 0.6, less than or equal to 0.5, less than or equal to 0.4, or less than or equal to 0.2. Combinations of the above-referenced ranges are also possible (e.g., greater than or equal to 0.1 and less than or equal to 15, greater than or equal to 1.0 and less than or equal to 3.0). Other ranges are also possible.

In an exemplary embodiment, the ionically conductive compound has a composition as in $Li_{16}S_{15}MP_2$. In another exemplary embodiment, the ionically conductive compound has a composition as in $Li_{20}S_{17}MP_2$. In yet another exemplary embodiment, the ionically conductive compound has a composition as in $Li_{21}S_{17}Si_2P$. In yet another exemplary embodiment, the ionically conductive compound has a composition as in $Li_{24}S_{19}MP_2$. For example an ionically conductive compound according to the present invention has a composition according to a formula selected from the group consisting of $Li_{16}S_{15}MP_2$, $Li_{20}S_{17}MP_2$ and $Li_{24}S_{19}MP_2$.

In some embodiments, w is equal to y. In certain embodiments, w is equal to 1.5y. In other embodiments, w is equal to 2y. In yet other embodiments, w is equal to 2.5y. In yet further embodiments, w is equal to 3y. Without wishing to be bound by theory, those skilled in the art would understand that the value of w may, in some cases, depend upon the valency of M. For example, in some embodiments, M is a tetravalent atom, w is 2y, and y is 0.1-6. In certain embodiments, M is a trivalent atom, w is 1.5y, and y is 0.1-6. In some embodiments, M is a bivalent atom, w is equal to y, and y is 0.1-6. Other valences and values for w are also possible.

In some embodiments, the ionically conductive compound has a composition as in formula (I) and M is tetravalent, x is 8-16, y is 0.1-6, w is 2y, and z is 0.1-3. In some such embodiments, the ionically conductive compound has a composition as in formula (II):

$$Li_{2x}S_{x+2y+5z}M_yP_{2z} \qquad (II),$$

where x is 8-16, y is 0.1-6, z is 0.1-3, and M is tetravalent and selected from the group consisting of Lanthanides, Group 4, Group 8, Group 12, and Group 14 atoms, and combinations thereof. In an exemplary embodiment, M is Si, x is 10.5, y is 1, and z is 1 such that the compound of formula (II) is $Li_{21}S_{17.5}SiP_2$.

In some embodiments, the ionically conductive compound has a composition as in formula (I) and M is trivalent, x is 8-16, y is 1, w is 1.5y, and z is 1. In some such embodiments, the ionically conductive compound has a composition as in formula (III):

$$Li_{2x}S_{x+1.5y+5z}M_yP_{2z} \qquad (III),$$

where x is 8-16, y is 0.1-6, z is 0.1-3, and M is trivalent and selected from the group consisting of Lanthanides, Group 3, Group 4, Group 5, Group 6, Group 7, Group 8, Group 9, Group 12, Group 13, and Group 14 atoms, and combinations thereof. In an exemplary embodiment, M is Ga, x is 10.5, y is 1, and z is 1 such that the compound of formula (III) is $Li_{21}S_{17}GaP_2$.

In some embodiments, M is a Group 4 (i.e. IUPAC Group 4) atom such as zirconium. In certain embodiments, M is a Group 8 (i.e. IUPAC Group 8) atom such as iron. In some embodiments, M is a Group 12 (i.e. IUPAC Group 12) atom such as zinc. In certain embodiments, M is a Group 13 (i.e. IUPAC Group 13) atom such as aluminum. In some embodiments, M is a Group 14 (i.e. IUPAC Group 14) atom such as silicon, germanium, or tin. In some cases, M may be selected from the groups consisting of Lanthanides, Group 3, Group 4, Group 5, Group 6, Group 7, Group 8, Group 9, Group 12, Group 13, and/or Group 14 atoms. For example, in some embodiments, M may be selected from silicon, tin, germanium, zinc, iron, zirconium, aluminum, and combinations thereof. In certain embodiments, M is selected from silicon, germanium, aluminum, iron and zinc. In some embodiments, M is a transition metal atom.

In some cases, M may be a combination of two or more atoms selected from the groups consisting of Lanthanides, Group 3, Group 4, Group 5, Group 6, Group 7, Group 8, Group 9, Group 12, Group 13, and Group 14 atoms. That is, in certain embodiments in which M includes more than one atom, each atom (i.e. each atom M) may be independently selected from the group consisting of Lanthanides, Group 3, Group 4, Group 5, Group 6, Group 7, Group 8, Group 9, Group 12, Group 13, and Group 14 atoms. In some embodiments, M is a single atom. In certain embodiments, M is a combination of two atoms. In other embodiments, M is a combination of three atoms. In some embodiments, M is a combination of four atoms. In some embodiments, M may be a combination of one or more monovalent atoms, one or more bivalent atoms, one or more trivalent atoms, and/or one or more tetravalent atoms selected from the groups consisting of Lanthanides, Group 3, Group 4, Group 5, Group 6, Group 7, Group 8, Group 9, Group 12, Group 13, and Group 14 atoms.

In such embodiments, the stoichiometric ratio of each atom in M may be such that the total amount of atoms present in M is y and is 0.1-6, or any other suitable range described herein for y. For example, in some embodiments, M is a combination of two atoms such that the total amount of the two atoms present in M is y and is 0.1-6. In certain embodiments, each atom is present in M in substantially the same amount and the total amount of atoms present in M is y and within the range 0.1-6, or any other suitable range described herein for y. In other embodiments, each atom may be present in M in different amounts and the total amount of atoms present in M is y and within the range 0.1-6, or any other suitable range described herein for y. In an exemplary embodiment, the ionically conductive compound has a composition as in formula (I) and each atom in M is either silicon or germanium and y is 0.1-6. For example, in such an embodiment, each atom in M may be either silicon or germanium, each present in substantially the same amount, and y is 1 since $M_y$ is $Si_{0.5}Ge_{0.5}$. In another exemplary embodiment, the ionically conductive compound has a composition as in formula (I) and each atom in M may be either silicon or germanium, each atom present in different amounts such that $M_y$ is $Si_{y-p}Ge_p$, where p is between 0 and y (e.g., y is 1 and p is 0.25 or 0.75). Other ranges and combinations are also possible. Those skilled in the art would understand that the value and ranges of y, in some embodiments, may depend on the valences of M as a combination of two or more atoms, and would be capable of selecting and/or determining y based upon the teachings of this specification. As noted above, in embodiments in which a compound of formula (I) includes more than one atom in M, the total y may be in the range of 0.1-6.

In an exemplary embodiment, M is silicon. For example, in some embodiments, the ionically conductive compound is $Li_{2x}S_{x+w+5z}Si_yP_{2z}$, where x is greater than or equal to 8 and less than or equal to 16, y is greater than or equal to 0.1 and less than or equal to 3, w is equal to 2y, and z is greater than or equal to 0.1 and less than or equal to 3. Each x, y and z may independently be chosen from the values and ranges of x, y and z described above, respectively. For example, in one particular embodiment, x is 10, y is 1, and z is 1, and the ionically conductive compound is $Li_{20}S_{17}SiP_2$. In some embodiments, x is 10.5, y is 1, and z is 1, and the ionically conductive compound is $Li_{21}S_{17.5}SiP_2$. In certain embodiments, x is 11, y is 1, and z is 1, and the ionically conductive compound is $Li_{22}S_{18}SiP_2$. In certain embodiments, x is 12, y is 1, and z is 1, and the ionically conductive compound is $Li_{24}S_{19}SiP_2$. In some cases, x is 14, y is 1, and z is 1, and the ionically conductive compound is $Li_{28}S_{21}SiP_2$. In yet another exemplary embodiment, M is a combination of two atoms, wherein the first atom is Si and the second atom is selected from the groups consisting of Lanthanides, Group 3, Group 4, Group 5, Group 6, Group 7, Group 8, Group 9, Group 12, Group 13, and Group 14 atoms. For example, in some embodiments, the ionically conductive compound is $Li_{2x}S_{x+w+5z}Si_aQ_bP_{2z}$ where Q is selected from the groups consisting of Lanthanides, Group 3, Group 4, Group 5, Group 6, Group 7, Group 8, Group 9, Group 12, Group 13, and Group 14 atoms, a+b=y, and each w, x, y and z may independently be chosen from the values and ranges of w, x, y and z described above, respectively. In some embodiments, the ionically conductive compound is $Li_{21}La_{0.5}Si_{1.5}PS_{16.75}$. In certain embodiments, the ionically conductive compound is $Li_{21}LaSiPS_{16.5}$. In certain embodiments, the ionically conductive compound is $Li_{21}AlSiPS_{16.5}$. In certain embodiments, the ionically conductive compound is $Li_{21}Al_{0.5}Si_{1.5}PS_{16.75}$. In certain embodiments, the ionically conductive compound is $Li_{21}AlSi_2S_{16}$. In certain embodiments, the ionically conductive compound is $Li_{21}BP_2S_{17}$.

It should be appreciated that while much of the above description herein relates to ionically conductive compounds where y is 1, z is 1, w is 2y, and comprises silicon, other combinations of values for w, x, y, and z and elements for M are also possible. For example, in some cases, M is Ge and the ionically conductive compound may be $Li_{2x}S_{x+w+5z}Ge_yP_{2z}$, where x is greater than or equal to 8 and less than or equal to 16, y is greater than or equal to 0.1 and less than or equal to 3, w is equal to 2y, and z is greater than or equal to 0.1 and less than or equal to 3. Each w, x, y and z may independently be chosen from the values and ranges of w, x, y and z described above, respectively. For example, in one particular embodiment, w is 2, x is 10, y is 1, and z is 1, and the ionically conductive compound is $Li_{20}S_{17}GeP_2$. In certain embodiments, w is 2, x is 12, y is 1, and z is 1, and the ionically conductive compound is $Li_{24}S_{19}GeP_2$. In some cases, w is 2, x is 14, y is 1, and z is 1, and the ionically conductive compound is $Li_{28}S_{21}GeP_2$. Other stoichiometric ratios, as described above, are also possible.

In certain embodiments, M is Sn and the ionically conductive compound may be $Li_{2x}S_{x+w+5z}Sn_yP_{2z}$, where x is greater than or equal to 8 and less than or equal to 16, y is greater than or equal to 0.1 and less than or equal to 3, w is equal to 2y, and z is greater than or equal to 0.1 and less than or equal to 3. Each w, x, y and z may independently be chosen from the values and ranges of w, x, y and z described above, respectively. For example, in one particular embodiment, w is 2, x is 10, y is 1, and z is 1, and the ionically conductive compound is $Li_{20}S_{17}SnP_2$. In certain embodiments, w is 2, x is 12, y is 1, and z is 1, and the ionically conductive compound is $Li_{24}S_{19}SnP_2$. In some cases, w is 2, x is 14, y is 1, and z is 1, and the ionically conductive compound is $Li_{28}S_{21}SnP_2$. Other stoichiometric ratios, as described above, are also possible.

In an exemplary embodiment, the ionically conductive compound has a composition as in formula (I):

$$Li_{2x}S_{x+w+5z}M_yP_{2z} \qquad (I)$$

wherein x is 5-14, y is 1-2, z is 0.5-1, (x+w+5z) is 12-21, and M is selected from the group consisting of Si, Ge, La, Al, B, Ga, and combinations thereof (e.g., such that $M_y$ is $La_{0.5}Si_{1.5}$, LaSi, AlSi, $Al_{0.5}Si_{1.5}$, or $AlSi_2$). Non-limiting examples of compounds having a composition as in formula (I) include $Li_{10}S_{12}SiP_2$, $Li_{12}S_{13}SiP_2$, $Li_{16}S_{15}SiP_2$, $Li_{20}S_{17}SiP_2$, $Li_{21}S_{17}Si_2P$, $Li_{21}S_{17.5}SiP_2$, $Li_{22}S_{18}SiP_2$, $Li_{24}S_{19}SiP_2$, $Li_{28}S_{21}SiP_2$, $Li_{24}S_{19}GeP_2$, $Li_{21}SiP_2S_{17.5}$, $Li_{21}La_{0.5}Si_{1.5}PS_{16.75}$, $Li_{21}LaSiPS_{16.5}$, $Li_{21}La_2PS_{16}$, $Li_{21}AlP_2S_{17}$, $Li_{17}AlP_2S_{15}$, $Li_{17}Al_2PS_{14}$, $Li_{11}AlP_2S_{12}$, $Li_{11}AlP_2S_{12}$, $Li_{21}AlSiPS_{16.5}$, $Li_{21}Al_{0.5}Si_{1.5}PS_{16.75}$, $Li_{21}AlSi_2S_{16}$, $Li_{21}BP_2S_{17}$, and $Li_{21}GaP_2S_{17}$. Other compounds are also possible.

In some embodiments, the ionically conductive compound (e.g., the ionically conductive compound of formula (I)) is in the form of a particle. A plurality of particles comprising the ionically conductive compound may be substantially ionically conductive (e.g., substantially conductive to lithium ions). For example, in certain embodiments, a plurality of particles comprising the ionically conductive compound may be conductive to ions of an electroactive material (e.g. lithium). In some cases, the plurality of particles may have an average ion conductivity (e.g., lithium ion conductivity) of greater than or equal to $10^{-4}$ S/cm. In certain embodiments, the average ion conductivity of the plurality of particles is greater than or equal to greater than or equal to $10^{-4}$ S/cm, greater than or equal to $10^{-3}$ S/cm, greater than or equal to $10^{-2}$ S/cm, or greater than or equal to $10^{-1}$S/cm. In some embodiments, the average ion conductivity of the plurality of particles is less than or equal to 1 S/cm, less than or equal to $10^{-1}$ S/cm, less than or equal to $10^{-2}$S/cm, or less than or equal to $10^{-3}$ S/cm. Combinations of the above-reference ranges are also possible (e.g., an ion conductivity greater than or equal to $10^{-4}$ S/cm and less than or equal to $10^{-1}$ S/cm, greater than or equal to $10^{-4}$ S/cm and less than or equal to $10^{-2}$S/cm). Other ion conductivities are also possible.

In some embodiments, the average ion conductivity of the plurality of particles can be determined before the particles are incorporated into a layer of an electrochemical cell (e.g., a protective layer, a solid electrolyte layer, an intercalated electrode layer). The average ionic conductivity can be measured by pressing the particles between two copper cylinders at a pressure of up to 4 tons/cm². In certain embodiments, the average ion conductivity (i.e., the inverse of the average resistivity) can be measured at 500 kg/cm² increments using a conductivity bridge (i.e., an impedance measuring circuit) operating at 1 kHz. In some such embodiments, the pressure is increased until changes in average ion conductivity are no longer observed in the sample. Conductivity may be measured at room temperature (e.g., 25 degrees Celsius).

In some embodiments, the average largest cross-sectional dimension of a plurality of particles (e.g., within a layer of an electrochemical cell, or prior to being incorporated into a layer) comprising the ionically conductive compound may be, for example, less than or equal to 100 microns, less than or equal to 50 microns, less than or equal to 25 microns, less than or equal to 10 microns, less than or equal to 5 microns, less or equal to 2 microns, less than or equal to 1 micron, less than or equal to 500 nm, less than or equal to 100 nm, or less than or equal to 50 nm. In some embodiments, the average largest cross-sectional dimension of the plurality of particles may be greater than or equal to 10 nm, greater than or equal to 100 nm, greater than or equal to 500 nm, greater than or equal to 1 micron, greater than or equal to 2 microns, greater than or equal to 5 microns, greater than or equal to 10 microns, greater than or equal to 25 microns, or greater than or equal to 50 microns. Combinations of the above-referenced ranges are also possible (e.g., a largest cross-sectional dimension of less than 100 microns and greater than 10 microns, less than 25 microns and greater than 1 micron, less than 2 microns and greater than 100 nm, less than 500 nm and greater than 10 nm).

The average largest cross-sectional dimension of the plurality of particles may be determined, for example, by imaging the particles with a scanning electron microscope (SEM). An image may be acquired at a magnification between 10× to 100,000×, depending on the overall dimensions of the plurality of particles. Those skilled in the art would be capable of selecting an appropriate magnification for imaging the sample. The average largest cross-sectional dimension of the plurality of particles can be determined by taking the longest cross-sectional dimension of each particle and averaging the longest cross-sectional dimensions (e.g., averaging the longest cross-sectional dimensions for 10 particles).

In some embodiments, particles comprising an ionically conductive compound described herein may be formed by heating a mixture of precursors, as described in more detail herein. In certain embodiments, the precursors comprise a mixture of the elements Li, S, P, and M, where M is as described above and is selected from the group consisting of Lanthanides, Group 3, Group 4, Group 5, Group 6, Group 7, Group 8, Group 9, Group 12, Group 13, and Group 14 atoms of the periodic system of elements, and combinations thereof. In some embodiments, the elements Li, S, P, and M are present either in elemental form or in chemically bound form. For example, Li may be provided in chemically bound form, such as in the form of a chemical compound comprising Li and atoms of one or more of the elements S, P, and M as described above (e.g., $Li_2S$. M, P and S may be provided in elemental form). In some embodiments, the precursors comprise a mixture of the elements Li, S, P, and Si. In certain embodiments, the precursors comprise a mixture of the elements Li, S, P, and Ge. In some cases, the precursors may comprise a mixture of the elements Li, S, P, and Sn.

In some embodiments, at least a portion of the precursors are selected from the group consisting of $xLi_2S$, $yMS_a$, and/or $zP_bS_c$, where x is 8-16, y is 0.1-6, z is 0.1-3, a is 0-8, b is 0-2, and c is 0-8 such that b+c is 1 or greater. For example, in some embodiments, x is 10-14, y is 1, a is 0-8, b is 1-2, and c is 2-5. In some embodiments, at least a portion of the precursors are selected from the group consisting of $Li_2S$, $MS_a$, and $P_bS_c$, where a is 0-8, b is 0-2, and c is 0-8 such that b+c is 1 or greater. For example, in some such embodiments, a is 0-8, b is 1-2, and c is 2-5. Non-limiting examples of suitable precursors include $Li_2S$, $SiS_2$, $GeS_2$, $SnS_2$, Si, Ge, Sn, $S_2$, $S_4$, $S_8$, $P_2S_5$, P, and combinations thereof.

In some embodiments, a is greater than or equal to 0, greater than or equal to 1, greater than or equal to 2, greater than or equal to 3, greater than or equal to 4, greater than or equal to 5, greater than or equal to 6, or greater than or equal to 7. In certain embodiments, a is less than or equal to 8, less than or equal to 7, less than or equal to 6, less than or equal to 5, less than or equal to 4, less than or equal to 3, or less than or equal to 2. Combinations of the above-referenced ranges are also possible (e.g., greater than or equal to 0 and less than or equal to 8, greater than or equal to 1 and less than or equal to 4, greater than or equal to 2 and less than or equal to 6, greater than or equal to 4 and less than or equal to 8). In some cases, a may be 0, (i.e. the precursor is elemental M).

In certain embodiments, b is greater than or equal to 0, or greater than or equal to 1. In some cases, b may be less than or equal to 2, or less than or equal to 1. Combinations of the above-referenced ranges are also possible (e.g., greater than or equal to 0 and less than or equal to 2). In some embodiments, b is 0 (i.e., the precursor is elemental sulfur). In certain embodiments, b is 1. In some cases, b may be 2.

In some embodiments, c is greater than or equal to 0, greater than or equal to 1, greater than or equal to 2, greater than or equal to 3, greater than or equal to 4, greater than or equal to 5, greater than or equal to 6, or greater than or equal to 7. In certain embodiments, c is less than or equal to 8, less than or equal to 7, less than or equal to 6, less than or equal to 5, less than or equal to 4, less than or equal to 3, or less than or equal to 2. Combinations of the above-referenced ranges are also possible (e.g., greater than or equal to 0 and less than or equal to 8, greater than or equal to 1 and less than or equal to 4, greater than or equal to 2 and less than or equal to 6, greater than or equal to 4 and less than or equal to 8). In certain embodiments, c is 0 (i.e., the precursor is elemental phosphor). In some embodiments, c is 1.

In some embodiments, b and c are selected such that b+c is 1 or greater (e.g., 2 or greater, 3 or greater, 4 or greater, 5 or greater, 6 or greater, 7 or greater, 8 or greater, or 9 or greater). In some cases b+c is less than or equal to 10, less than or equal to 9, less than or equal to 8, less than or equal to 7, less than or equal to 6, less than or equal to 5, less than or equal to 4, less than or equal to 3, or less than or equal to 2. Combinations of the above-referenced ranges are also possible.

In an exemplary embodiment, at least some of the precursors are selected from the group consisting of $xLi_2S$, $yMS_a$, and/or $zP_bS_c$, and x is 10, y is 1, z is 1, a is 2, b is 2 and c is 5.

In certain embodiments, a mixture of precursors described herein has a stoichiometric ratio of the elements Li, S, P, and M as in formula (I), as described above (i.e., $Li_{2x}S_{x+w+5z}M_yP_{2z}$). In some embodiments, Li, S, P, and M have a stoichiometric ratio such that the plurality of particles formed from the mixture comprises a compound of formula (I). For example, in some cases, the mixture of precursors are selected such that the ratio of the elements Li, S, P, and M result in the formation of an ionically conductive compound described herein, such as $Li_{20}S_{17}MP_2$, $Li_{21}S_{17.5}SiP_2$, $Li_{22}S_{18}SiP_2$, $Li_{24}S_{19}MP_2$, or $Li_{28}S_{21}MP_2$. Other suitable ratios for forming a compound as in formula (I) are also possible. For example, in certain cases, excess S may be present in the mixture (e.g., sulfur in excess of that included in a formula of an ionically conductive compound described herein). The excess S may, for example, compensate for sulfur loss during mixing. For instance, in some embodiments, the mixture of precursors described herein has a stoichiometric ratio of the elements $Li_{2x}$, $P_{2z}$, $M_y$, and $S_d$ where x, y, and z are as described above and d is greater than or equal to the sum of x+w+5z, where w is as described above.

For instance, in some embodiments d may be greater than or equal to 15, greater than or equal to 17, greater than or equal to 19, greater than or equal to 21, greater than or equal to 23, greater than or equal to 25, greater than or equal to 30, greater than or equal to 35, greater than or equal to 40, greater than or equal to 45, greater than or equal to 50, greater than or equal to 100, or greater than or equal to 150. In certain embodiments, d may be less than or equal to 200, less than or equal to 100, less than or equal to 50, or less than or equal to 45. Combinations of the above referenced ranges are also possible (e.g., greater than or equal to 15 and less than or equal to 200). Other ranges are also possible.

In some embodiments, the mixture of precursors comprise or consist of: $Li_2S$, $MS_2$ (e.g., $SiS_2$ or $GeS_2$) and $P_2S_5$; or $Li_2S$, M (e.g., Si or Ge), $S_8$ and $P_2S_5$; or $Li_2S$, M (e.g., Si or Ge), $S_8$ and P.

The mixture of precursors (e.g., comprising a mixture of the elements Li, S, P, and M) may be heated to any suitable temperature for forming a compound described herein. In certain embodiments, the mixture of precursors is heated to a temperature of greater than or equal to 400° C., greater than or equal to 450° C., greater than or equal to 500° C., greater than or equal to 550° C., greater than or equal to 600° C., greater than or equal to 650° C., greater than or equal to 700° C., greater than or equal to 750° C., greater than or equal to 800° C., or greater than or equal to 850° C. In some embodiments, the mixture of precursors is heated to a temperature less than or equal to 900° C., less than or equal to 850° C., less than or equal to 800° C., less than or equal to 750° C., less than or equal to 700° C., less than or equal to 650° C., less than or equal to 600° C., less than or equal to 550° C., less than or equal to 500° C., or less than or equal to 450° C. Combinations of the above-referenced ranges are also possible (e.g., greater than or equal to 400° C. and less than or equal to 900° C., greater than or equal to 400° C. and less than or equal to 800° C., greater than or equal to 500° C. and less than or equal to 700° C., greater than or equal to 600° C. and less than or equal to 800° C.). Other ranges are also possible.

The mixture of precursors may be heated for any suitable amount of time. In some cases, the mixture of precursors may be heated for greater than or equal to 3 hours, greater than or equal to 5 hours, greater than or equal to 8 hours, greater than or equal to 12 hours, greater than or equal to 16 hours, or greater than or equal to 20 hours. In certain embodiments, the mixture of precursors is heated for less than or equal to 24 hours, less than or equal to 48 hours, less than or equal to 36 hours, less than or equal to 24 hours, less than or equal to 20 hours, less than or equal to 16 hours, less than or equal to 12 hours, less than or equal to 8 hours, or less than or equal to 5 hours. Combinations of the above referenced ranges are also possible (e.g., greater than or equal to 3 hours and less than or equal to 24 hours, greater than or equal to 5 hours and less than or equal to 12 hours, greater than or equal to 8 hours and less than or equal to 20 hours, greater than or equal to 12 hours and less than or equal to 24 hours). Other ranges are also possible.

The mixture of precursors may be heated at any suitable pressure. In some embodiments, the mixture of precursors are heated at a relatively low pressure. For example, in certain embodiments, the mixture of precursors is heated at a pressure of between 0.1 MPa and 0.3 MPa, or at other suitable pressures.

In certain embodiments, after heating the mixture of precursors, the mixture is cooled. For example, the mixture of precursors may be heated to a temperature between 400° C. and 900° C. (e.g., between 400° C. and 800° C.) for between 3 hours to 24 hours, and the mixture may be cooled to a temperature less than 400° C. such as room temperature. The mixture may then be ground into a plurality of particles of desired size. Those skilled in the art would be capable of selecting suitable methods for grinding a material into particles including, for example, ball milling or blender crushing. In some embodiments, the mixture of precursors may be ground in a ball mill prior to and/or during heating. In some cases, the grinding of the plurality of particles is conducted at relative low pressures. For example, the grinding of the plurality of particles may be conducted at pressures less than or equal to about 1 GPa, less than or equal to about 500 MPa, less than or equal to about 100 MPa, less than or equal to about 50 MPa, less than or equal to about 10 MPa, less than or equal to about 5 MPa, less than or equal to about 1 MPa, or less than or equal to about 0.5 MPa. In certain embodiments, the grinding of the plurality of particles may be conducted at pressures of at least about 0.1 MPa, at least about 0.5 MPa, at least about 1 MPa, at least about 5 MPa, at least about 10 MPa, at least about 50 MPa, at least about 100 MPa, or at least about 500 MPa. Combinations of the above-referenced ranges are also possible (e.g., at least about 0.1 MPa and less than or equal to about 1 GPa). Other ranges are also possible.

In some embodiments, a compound described herein (e.g., the compound of formula (I)) is deposited as a layer. In certain embodiments, a plurality of particles comprising the compound of formula (I) are deposited as a layer (e.g., in an electrochemical cell).

A layer comprising a compound described herein (e.g., the compound of formula (I)) may be deposited on a surface (e.g., on another layer) by any suitable method such as sputtering (e.g., magnetron sputtering), ion beam deposition, molecular beam epitaxy, electron beam evaporation, vacuum thermal evaporation, aerosol deposition, sol-gel, laser ablation, chemical vapor deposition (CVD), thermal evaporation, plasma enhanced chemical vacuum deposition (PECVD), laser enhanced chemical vapor deposition, jet vapor deposition, etc. In some embodiments, a layer comprising a compound described herein is made by cold pressing. The technique used may depend on the desired thickness of the layer, the material being deposited on, etc. The compound of formula (I) may be deposited in powder form, in some cases. In some embodiments, the particles comprising the compound of formula (I) may be deposited on a surface and sintered.

In some embodiments, the layer comprising the compound of formula (I) is deposited on an electrode/electroactive material (e.g., an anode, a cathode). In certain embodiments, the layer comprising the compound of formula (I) is deposited on a separator, a protective layer, an electrolyte layer, or another layer of an electrochemical cell.

In certain embodiments, a layer comprising the compound of formula (I), or a plurality of particles comprising the compound of formula (I) as described herein, is substantially crystalline. In some embodiments, the layer comprising the compound of formula (I), or a plurality of particles comprising the compound of formula (I) as described herein, is at least partially amorphous. In certain embodiments, the layer comprising the compound of formula (I), or a plurality of particles comprising the compound of formula (I) as described herein, is between 1 wt. % and 100 wt. % crystalline. That is to say, in some embodiments, the crystalline fraction of the compound of formula (I) comprised by the layer (or particles) is in the range of 1% to 100% based on the total weight of the compound of formula (I) comprised by the layer (or particles). In certain embodiments, the layer comprising the compound of formula (I), or a plurality of particles comprising the compound of formula (I) as described herein, is greater than or equal to 1 wt. %, greater than or equal to 2 wt. %, greater than or equal to 5 wt. %, greater than or equal to 10 wt. %, greater than or equal to 20 wt. %, greater than or equal to 25 wt. %, greater than or equal to 50 wt. %, greater than or equal to 75 wt. %, greater than or equal to 90 wt. %, greater than or equal to 95 wt. %, greater than or equal to 98 wt. %, greater than or equal to 99 wt. %, or greater than or equal to 99.9 wt. % crystalline. In certain embodiments, the layer comprising the compound of formula (I), or a plurality of particles comprising the compound of formula (I) as described herein, is less than or equal to 99.9 wt. %, less than or equal to 98 wt. %, less than or equal to 95 wt. %, less than or equal to 90 wt. %, less than or equal to 75 wt. %, less than or equal to 50 wt. %, less than or equal to 25 wt. %, less than or equal to 20 wt. %, less than or equal to 10 wt. %, less than or equal to 5 wt. %, or less than or equal to 2 wt. % crystalline.

In some embodiments, a layer comprising the compound of formula (I), or a plurality of particles comprising the compound of formula (I) as described herein, is greater than or equal to 99.2 wt. %, greater than or equal to 99.5 wt. %, greater than or equal to 99.8 wt. %, or greater than or equal to 99.9 wt. % crystalline. In some cases, a layer comprising the compound of formula (I), or a plurality of particles comprising the compound of formula (I) as described herein, may be 100% crystalline. Combinations of the above referenced ranges are also possible (e.g., greater than or equal to 1 wt. % and less than or equal to 100 wt. %, greater than or equal to 50 wt. % and less than or equal to 100 wt. %).

In some embodiments, the compound of formula (I) has a cubic crystal structure. Unless indicated otherwise, the crystal structure and/or percent crystallinity as used herein is determined by x-ray diffraction crystallography at a wavelength of 1.541 nm using a synchrotron of particles comprising the compound. In some instances, Raman spectroscopy may be used.

In some embodiments, the ionically conductive compound of formula (I) may be present in a layer (e.g., a separator, a protective layer) in an amount of at least about 1 wt %, at least about 2 wt %, at least about 5 wt %, at least about 10 wt %, at least about 20 wt %, about 30 wt %, at least about 40 wt %, at least about 50 wt %, at least about 60 wt %, at least about 70 wt %, at least about 80 wt %, at least about 85 wt %, at least about 90 wt %, at least about 95 wt %, or at least about 98 wt % versus the total layer weight. In certain embodiments, the ionically conductive compound of formula (I) is present in the layer in an amount of less than or equal to about 100 wt %, less than or equal to about 99 wt %, less than or equal to about 98 wt %, less than or equal to about 95 wt %, less than or equal to about 90 wt %, less than or equal to about 85 wt %, less than or equal to about 80 wt %, less than or equal to about 70 wt %, less than or equal to about 60 wt %, less than or equal to about 50 wt %, less than or equal to about 40 wt %, less than or equal to about 30 wt %, less than or equal to about 20 wt %, less than or equal to about 10 wt %, less than or equal to about 5 wt %, or less than or equal to about 2 wt % versus the total layer weight. Combinations of the above-referenced ranges are also possible (e.g., at least about 1 wt % and less than or equal to about 100 wt %). Other ranges are also possible.

In some cases, the layer may comprise the ionically conductive compound of formula (I) and one or more additional materials (e.g., polymers, metals, ceramics, ionically-conductive materials) as described in more detail, below.

In some embodiments, one or more layers of an electrochemical cell may comprise the ionically conductive compound of formula (I). In some cases, the compound in the one or more layers is in the form of a plurality of particles. In some embodiments, the layer comprising the compound of formula (I) is in direct contact with an electrode (e.g., an electroactive material of the electrode).

In certain embodiments, the layer comprising the compound of formula (I) may allow ions (e.g., electrochemically active ions, such as lithium ions) to pass through the layer but may substantially impede electrons from passing across the layer. By "substantially impedes", in this context, it is meant that in this embodiment the layer allows lithium ion flux greater than or equal to ten times greater than electron passage. Advantageously, particles and layers described herein (e.g., comprising the compound of formula (I)) may be capable of conducting specific cations (e.g., lithium cations) while not conducting certain anions (e.g., polysulfide anions) and/or may be capable of acting as a barrier to an electrolyte and/or a component in the electrolyte (e.g., a polysulfide species) for the electrode.

In some embodiments, the layer (e.g., a separator, a protective layer, a solid electrolyte layer) comprising the ionically conductive compound of formula (I) is ionically conductive. In some embodiments, the average ionic conductivity of the layer comprising the ionically conductive compound of formula (I) is greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm. In certain embodiments, the average ionic conductivity of the layer comprising the ionically conductive compound of formula (I) may be less than or equal to 1 S/cm, less than or equal to $10^{-1}$ S/cm, less than or equal to $10^{-2}$ S/cm, less than or equal to $10^{-3}$ S/cm, or less than or equal to $10^{-4}$ S/cm. Combinations of the above-referenced ranges are also possible (e.g., an average ionic conductivity of greater than or equal to $10^{-5}$ S/cm and less than or equal to $10^{-1}$ S/cm). Other ion conductivities are also possible.

In some embodiments, the average ion conductivity of the layer comprising the ionically conductive compound of formula (I) can be determined by pressing the layer between two copper cylinders at a pressure of up to 3 tons/cm². In certain embodiments, the average ion conductivity (i.e., the inverse of the average resistivity) can be measured at 500 kg/cm² increments using a conductivity bridge (i.e., an impedance measuring circuit) operating at 1 kHz. In some such embodiments, the pressure is increased until changes in average ion conductivity are no longer observed in the sample. Conductivity may be measured at room temperature (e.g., 25 degrees Celsius).

As described herein, it may be desirable to determine if a layer including a compound described herein has advantageous properties as compared to a layer formed of other materials for particular electrochemical systems. Simple screening tests can be employed to help select between candidate materials. One simple screening test includes positioning a layer (e.g., comprising the compound of formula (I)) in an electrochemical cell, e.g., as a protective layer in a cell. The electrochemical cell may then undergo multiple discharge/charge cycles, and the electrochemical cell may be observed for whether inhibitory or other destructive behavior occurs compared to that in a control system. If inhibitory or other destructive behavior is observed during cycling of the cell, as compared to the control system, it may be indicative of degradation or other failure of the layer in question, within the assembled electrochemical cell. It is also possible to evaluate the electrical conductivity and/or ion conductivity of the layer using methods described herein and known to one of ordinary skill in the art. The measured values may be compared to select between candidate materials and may be used for comparison with baseline material(s) in the control.

In some embodiments, it may be desirable to test the layer (e.g., a layer comprising the compound of formula (I)) for swelling in the presence of a particular electrolyte or solvent to be used in an electrochemical cell. A simple screening test may involve, for example, pieces of the layer that are weighed and then placed in a solvent or an electrolyte to be used in an electrochemical cell for any suitable amount of time (e.g., 24 hours). The percent difference in weight (or volume) of the layer before and after the addition of a solvent or an electrolyte may determine the amount of swelling of the layer in the presence of the electrolyte or the solvent.

Another simple screening test may involve determining the stability (i.e., integrity) of a layer (e.g., a layer comprising the compound of formula (I)) to polysulfides. Briefly, the layer may be exposed to a polysulfide solution/mixture for any suitable amount of time (e.g., 72 hours) and the percent weight loss of the layer after exposure to the polysulfide solution may be determined by calculating the difference in weight of the layer before and after the exposure. For example, in some embodiments, the percent weight loss of the layer after exposure to the polysulfide solution may be less than or equal to 15 wt. %, less than or equal to 10 wt. %, less than or equal to 5 wt. %, less than or equal to 2 wt. %, less than or equal to 1 wt. %, or less than or equal to 0.5 wt. %. In certain embodiments, the percent weight loss of the layer after exposure to the polysulfide solution may be greater than or equal to 0.1 wt. %, greater than or equal to 0.5 wt. %, greater than or equal to 1 wt. %, greater than or equal to 2 wt. %, greater than or equal to 5 wt. %, or greater than or equal to 10 wt. %. Combinations of the above-referenced ranges are also possible (e.g., greater than or equal to 0.1 wt. % and less than or equal to 5 wt. %).

Yet another simple screening test may involve determining the stability (i.e. integrity) of a layer (e.g., a layer comprising the compound of formula (I)) to metallic lithium. Briefly, a layer or a pellet comprising the compound of formula (I) may be placed between two lithium metal foils in an electrochemical cell and one can measure the change in impedance over any suitable amount of time (e.g., 72 hours). In general, the lower impedance may result in a greater stability of the layer to metallic lithium.

The above described screening tests may also be adapted and used to determine the properties of individual components of the layer (e.g., a plurality of particles comprising the compound of formula (I)).

Turning now to the figures, the various embodiments of the current disclosure are described in more detail below. It should be understood that while certain layers depicted in the figures are disposed directly on one another, other intermediate layers may also be present between the depicted layers in certain embodiments. Accordingly, as used herein, when a layer is referred to as being "disposed on", "deposited on", or "on" another layer, it can either be directly disposed on, deposited onto, or on the layer, or an intervening layer may also be present. In contrast, a layer that is "directly disposed on", "in contact with", "directly deposited on", or "directly on" another layer indicates that no intervening layer is present.

In some embodiments, one or more ionically conductive compounds described herein may be incorporated into a separator (e.g., separator 30 in FIG. 1A). Generally, a separator is interposed between a cathode and an anode in an electrochemical cell. The separator may separate or insulate the anode and the cathode from each other preventing short circuiting, and may permit the transport of ions between the anode and the cathode. The separator may be porous, wherein the pores may be partially or substantially filled with electrolyte. Separators may be supplied as porous free standing films which are interleaved with the anodes and the cathodes during the fabrication of cells. Alternatively, the separator layer may be applied directly to the surface of one of the electrodes.

FIG. 1A shows an example of an article that can be incorporated into an electrochemical cell. Article 10 includes an electrode 20 (e.g., an anode or a cathode) that comprises an electroactive material and a separator 30 adjacent the electrode. In some embodiments, the separator (e.g., separator 30) comprises the ionically conductive compound of formula (I) and/or a plurality of particles comprising the ionically conductive compound of formula (I). However, other materials can also be used to form the separator. The electrode may include an electroactive material (e.g., an anode active electrode material, a cathode active electrode material), described in more detail below.

Figure 1B:
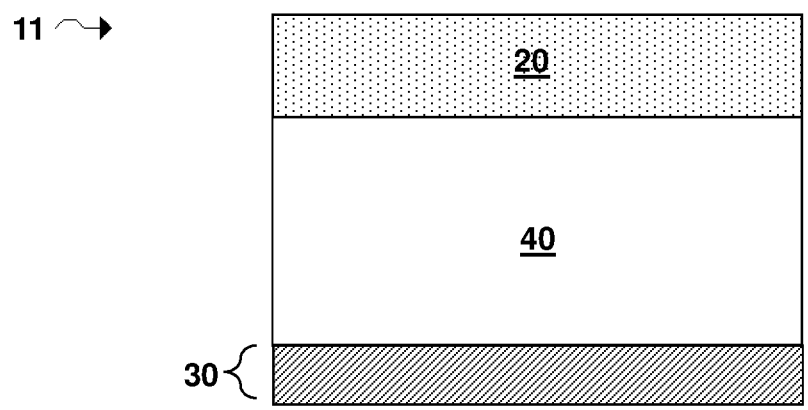

In some embodiments, the electrochemical cell comprises an electrolyte. In some embodiments, the separator is located between the electrolyte and an electrode (e.g., an anode, a cathode). For example, as illustrated in FIG. 1B, article 11 includes an electrode 20 (e.g., an anode or a cathode) that comprises an electroactive material, an electrolyte 40 adjacent the electrode, and separator 30 adjacent the electrolyte. The electrolyte can function as a medium for the storage and transport of ions. The electrolyte may have any suitable configuration such as a liquid electrolyte, a solid electrolyte, or a gel polymer electrolyte, as described in more detail herein.

In some embodiments, the separator comprises a polymeric material (e.g., polymeric material that does or does not swell upon exposure to electrolyte). The separator may optionally include an ionically conductive compound (or plurality of particles comprising the compound) of formula (I). In certain embodiments, the ionically conductive compound is directly deposited on at least a portion of a surface of the separator. In certain embodiments, the ionically conductive compound is incorporated into the separator.

The separator can be configured to inhibit (e.g., prevent) physical contact between a first electrode and a second electrode, which could result in short circuiting of the electrochemical cell. The separator can be configured to be substantially electronically non-conductive, which can inhibit the degree to which the separator causes short circuiting of the electrochemical cell. In certain embodiments, all or portions of the separator can be formed of a material with a bulk electronic resistivity of greater than or equal to $10^4$, greater than or equal to $10^5$, greater than or equal to $10^{10}$, greater than or equal to $10^{15}$, or greater than or equal to $10^{20}$ Ohm-meters. In some embodiments, the bulk electronic resistivity may be less than or equal to $10^{50}$ Ohm-meters. Bulk electronic resistivity may be measured at room temperature (e.g., 25 degrees Celsius).

In some embodiments, the separator can be a solid. The separator may be porous to allow an electrolyte solvent to pass through it. In some cases, the separator does not substantially include a solvent (like in a gel), except for solvent that may pass through or reside in the pores of the separator. In other embodiments, a separator may be in the form of a gel.

In some embodiments, the porosity of the separator can be, for example, greater than or equal to 30 vol %, greater than or equal to 40 vol %, greater than or equal to 50%, greater than or equal to 60 vol %, greater than or equal to 70 vol %, greater than or equal to 80 vol %, or greater than or equal to 90 vol %. In certain embodiments, the porosity is less than or equal to 90 vol %, less than or equal to 80 vol %, less than or equal to 70 vol %, less than or equal to 60 vol %, less than or equal to 50 vol %, less than or equal to 40 vol %, or less than or equal to 30 vol %. Other porosities are also possible. Combinations of the above-noted ranges are also possible. Porosity as used herein refers to the fraction of a volume of voids in a layer divided by the total volume of the layer and is measured using mercury porosimetry.

A separator can be made of a variety of materials. In some embodiments, the separator comprises the ionically conductive compound of formula (I). Additional or alternatively, the separator may comprise a suitable separator material such as a polymer material. Examples of suitable polymer materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The mechanical and electronic properties (e.g., conductivity, resistivity) of these polymers are known. Accordingly, those of ordinary skill in the art can choose suitable materials based on their mechanical and/or electronic properties (e.g., ionic and/or electronic conductivity/resistivity), and/or can modify such polymers to be ionically conducting (e.g., conductive towards single ions) based on knowledge in the art, in combination with the description herein. For example, the polymer materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), and/or the ionically conductive compound of formula (I) to enhance ionic conductivity, if desired.

The separator may be porous. In some embodiments, the separator pore size may be, for example, less than 5 microns. In some embodiments, the pore size may be less than or equal to 5 microns, less than or equal to 3 microns, less than or equal to 2 microns, less than or equal to 1 micron, less than or equal to 500 nm, less than or equal 30 to 300 nm, less than or equal to 100 nm, or less than or equal to 50 nm. In some embodiments, the pore size may be greater than or equal to 50 nm, greater than or equal to 100 nm, greater than or equal to 300 nm, greater than or equal to 500 nm, or greater than or equal to 1 micron. Other values are also possible. Combinations of the above-noted ranges are also possible (e.g., a pore size of less than 300 nm and greater than or equal to 100 nm). In certain embodiments, the separator may be substantially non-porous.

The separator may have any suitable thickness. In some embodiments, the separator may have a thickness of greater than or equal to 500 nm, greater than or equal to 1 micron, greater than or equal to 5 microns, greater than or equal to 10 microns, greater than or equal to 15 microns, greater than or equal to 20 microns, greater than or equal to 25 microns, greater than or equal to 30 microns, or greater than or equal to 40 microns. In some embodiments, the thickness of the separator is less than or equal to 50 microns, less than or equal to 40 microns, less than or equal to 30 microns, less than or equal to 20 microns, less than or equal to 10 microns, or less than or equal to 5 microns. Other values are also possible. Combinations of the above-noted ranges are also possible.

The average thickness of the separator or other layers described herein is determined by scanning electron microscopy (SEM). Briefly, the layer can be imaged along a cross-section (e.g., by cutting the layer) after formation and the image may be acquired by SEM. The average thickness may be determined by taking an average of the thickness of the sample at several different locations along the cross-section (e.g., at least 10 locations). Those skilled in the art would be capable of selecting an appropriate magnification for imaging the sample.

Figure 1C:
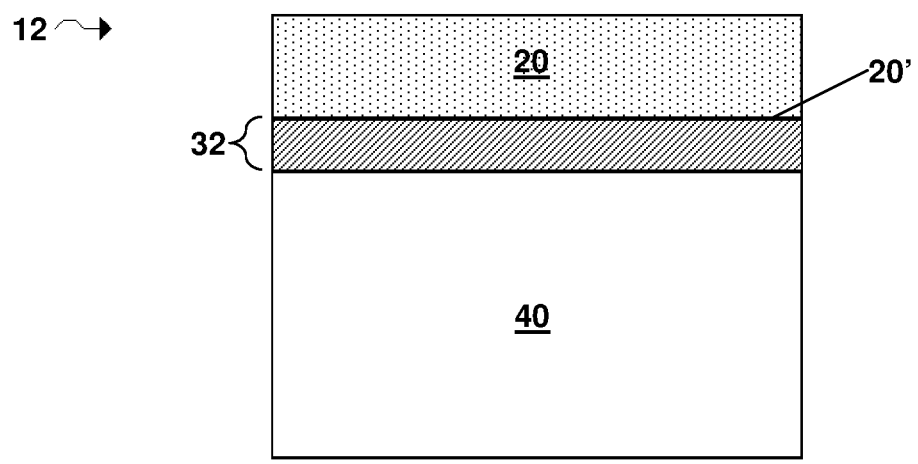

In certain embodiments, a protective layer may comprise the ionically conductive compound of formula (I) and/or a plurality of particles comprising the ionically conductive compound of formula (I). In some embodiments, a protective layer that incorporates the ionically conductive compounds described herein is substantially impermeable to the electrolyte. The protective layer may be configured such that it is unswollen in the presence of the electrolyte. However, in other embodiments, at least a portion of the protective layer can be swollen in the presence of the electrolyte. The protective layer may, in some cases, be substantially non-porous. The protective layer may be positioned directly adjacent an electrode, or adjacent the electrode via an intervening layer (e.g., another protective layer). Referring now to FIG. 1C, in some embodiments, an article 12 comprises electrode 20, a protective layer 32 disposed on or adjacent at least a portion of electrode active surface 20', and an optional electrolyte 40. In other embodiments, a second protective layer (not shown in FIG. 1C) adjacent protective layer 32 may be present. In some embodiments, at least one or both of protective layer 32 and the second protective layer includes an ion-conductive layer comprising the ionically conductive compound of formula (I). Other configurations are also possible.

Although in some embodiments the protective layer is an ion-conductive layer comprising the ionically conductive compound of formula (I), other materials may also be used in addition to, or alternatively to, the compound of formula (I) to form the protective layer. Additionally, where more than one protective layer may be present, each of the layers may independently formed of one or more materials described herein. In some embodiments, the protective layer comprises a ceramic and/or a glass (e.g., an ion conducting ceramic/glass conductive to lithium ions). Suitable glasses and/or ceramics include, but are not limited to, those that may be characterized as containing a "modifier" portion and a "network" portion, as known in the art. The modifier may include a metal oxide of the metal ion conductive in the glass or ceramic. The network portion may include a metal chalcogenide such as, for example, a metal oxide or sulfide. For lithium metal and other lithium-containing electrodes, an ion conductive layer may be lithiated or contain lithium to allow passage of lithium ions across it. Ion conductive layers may include layers comprising a material such as lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium lanthanum zirconium oxides, lithium titanium oxides, lithium borosulfides, lithium aluminosulfides, lithium phosphates, and lithium phosphosulfides, and combinations thereof. The selection of the material will be dependent on a number of factors including, but not limited to, the properties of electrolyte, anode, and cathode used in the cell.

In one set of embodiments, the protective layer is a non-electroactive metal layer. The non-electroactive metal layer may comprise a metal alloy layer, e.g., a lithiated metal layer especially in the case where a lithium anode is employed. The lithium content of the metal alloy layer may vary from 0.5% by weight to 20% by weight, depending, for example, on the specific choice of metal, the desired lithium ion conductivity, and the desired flexibility of the metal alloy layer. Suitable metals for use in the ion conductive material include, but are not limited to, Al, Zn, Mg, Ag, Pb, Cd, Bi, Ga, In, Ge, Sb, As, and Sn. Sometimes, a combination of metals, such as the ones listed above, may be used in an ion conductive material.

The protective layer may have any suitable thickness. In some embodiments, the protective layer described herein may have a thickness of greater than or equal to 1 nm, greater than or equal to 2 nm, greater than or equal to 5 nm, greater than or equal to 10 nm, greater than or equal to 20 nm, greater than or equal to 50 nm, greater than or equal to 100 nm, greater than or equal to 500 nm, greater than or equal to 1 micron, greater than or equal to 2 microns, or greater than or equal to 5 microns. In certain embodiments, the protective layer may have a thickness of less than or equal to 10 microns, less than or equal to 5 microns, less than or equal to 2 microns, less than or equal to 1 micron, less than or equal to 500 nm, less than or equal to 100 nm, less than or equal to 50 nm, less than or equal to 20 nm, less than or equal to 10 nm, less than or equal to 5 nm, or less than or equal to 2 nm. Other values are also possible. Combinations of the above-noted ranges are also possible.

In some embodiments, the protective layer is a polymer layer or a layer that comprises a polymeric material. In some embodiments, the ionically conductive compound of formula (I) is incorporated into the polymer layer. Suitable polymer layers for use in electrochemical cells may be, for example, highly conductive towards lithium and minimally conductive towards electrons. Such polymers may include, for example, ionically conductive polymers, sulfonated polymers, and hydrocarbon polymers. The selection of the polymer will be dependent upon a number of factors including the properties of electrolyte, anode, and cathode used in the cell. Suitable ionically conductive polymers include, e.g., ionically conductive polymers known to be useful in solid polymer electrolytes and gel polymer electrolytes for lithium electrochemical cells, such as, for example, polyethylene oxides. Suitable sulfonated polymers include, e.g., sulfonated siloxane polymers, sulfonated polystyrene-ethylene-butylene polymers, and sulfonated polystyrene polymers. Suitable hydrocarbon polymers include, e.g., ethylene-propylene polymers, polystyrene polymers, and the like.

Polymer layers can also include crosslinked polymer materials formed from the polymerization of monomers such as alkyl acrylates, glycol acrylates, polyglycol acrylates, polyglycol vinyl ethers, and polyglycol divinyl ethers. For example, one such crosslinked polymer material is polydivinyl poly(ethylene glycol). The crosslinked polymer materials may further comprise salts, for example, lithium salts, to enhance ionic conductivity. In one embodiment, the polymer layer comprises a crosslinked polymer.

Other classes polymers that may be suitable for use in a polymer layer include, but are not limited to, polyamines (e.g., poly(ethylene imine) and polypropylene imine (PPI)); polyamides (e.g., polyamide (Nylon), poly($\epsilon$-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). The mechanical and electronic properties (e.g., conductivity, resistivity) of these polymers are known. Accordingly, those of ordinary skill in the art can choose suitable polymers for use in lithium batteries, e.g., based on their mechanical and/or electronic properties (e.g., ionic and/or electronic conductivity), and/or can modify such polymers to be ionically conducting (e.g., conductive towards single ions) and/or electronically conducting based on knowledge in the art, in combination with the description herein. For example, the polymer materials listed above may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

The polymeric materials can be selected or formulated to have suitable physical/mechanical characteristics by, for example, tailoring the amounts of components of polymer blends, adjusting the degree of cross-linking (if any), etc.

In some embodiments, a composite layer comprises a polymer material and an ionically conductive compound described herein (e.g., an ionically conductive compound of formula (I)). Such a composite layer may be formed by any suitable method including, for example: co-spraying (e.g., via aerosol deposition) the polymer material and the ionically conductive compound of formula (I) onto a substrate; casting the composite layer from a slurry, solution, or suspension comprising the polymer material and the ionically conductive compound of formula (I); pressing particles comprising the ionically conductive compound of formula (I) into a polymer layer comprising a polymer material; and/or filling pores of a layer comprising the ionically conductive compound of formula (I) with a polymer material. Other methods for forming composite layers are also possible and are generally known in the art. The composite layer may be used for any suitable component of an electrochemical cell described herein, such as a protective layer. These and other methods for forming such composite layers are described in more detail in U.S. Provisional Patent Application No. 62/164,200, filed May 20, 2015 and entitled "Protective Layers for Electrodes," which is incorporated herein by reference in its entirety.

As described herein, in certain embodiments, the electrochemical cell comprises an electrolyte (e.g., electrolyte 40 in FIGS. 1B-1C). The electrolytes used in electrochemical or battery cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions may be used, so long as the material facilitates the transport of ions (e.g., lithium ions) between the anode and the cathode. The electrolyte may be electronically non-conductive to prevent short circuiting between the anode and the cathode. In some embodiments, the electrolyte may comprise a non-solid electrolyte.

In some embodiments, an electrolyte is in the form of a layer having a particular thickness. An electrolyte layer may have a thickness of, for example, greater than or equal to 1 micron, greater than or equal to 5 microns, greater than or equal to 10 microns, greater than or equal to 15 microns, greater than or equal to 20 microns, greater than or equal to 25 microns, greater than or equal to 30 microns, greater than or equal to 40 microns, greater than or equal to 50 microns, greater than or equal to 70 microns, greater than or equal to 100 microns, greater than or equal to 200 microns, greater than or equal to 500 microns, or greater than or equal to 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible.

In some embodiments, the electrolyte includes a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity) as described herein. Examples of useful non-aqueous liquid electrolyte solvents include, but are not limited to, non-aqueous organic solvents, such as, for example, N-methyl acetamide, acetonitrile, acetals, ketals, esters (e.g., esters of carbonic acid), carbonates (e.g., ethylene carbonate, dimethyl carbonate), sulfones, sulfites, sulfolanes, suflonimidies (e.g., bis(trifluoromethane)sulfonimide lithium salt). aliphatic ethers, acyclic ethers, cyclic ethers, glymes, polyethers, phosphate esters (e.g., hexafluorophosphate), siloxanes, dioxolanes, N-alkylpyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some cases, mixtures of the solvents described herein may also be used. For example, in some embodiments, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may range, in some cases, from 5 wt. %:95 wt. % to 95 wt. %:5 wt. %.

Non-limiting examples of suitable gel polymer electrolytes include polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing.

In some embodiments, the non-aqueous electrolyte comprises at least one lithium salt. For example, in some cases, the at least one lithium salt is selected from the group consisting of $LiNO_3$, $LiPF_6$, $LiBF_4$, $LiClO_4$, $LiAsF_6$, $Li_2SiF_6$, $LiSbF_6$, $LiAlCl_4$, lithium bis-oxalatoborate, $LiCF_3SO_3$, $LiN(SO_2F)_2$, $LiC(C_nF_{2n+1}SO_2)_3$, wherein n is an integer in the range of from 1 to 20, and $(C_nF_{2n+1}SO_2)_mQLi$ with n being an integer in the range of from 1 to 20, m being 1 when Q is selected from oxygen or sulfur, m being 2 when X is selected from nitrogen or phosphorus, and m being 3 when Q is selected from carbon or silicon.

Figure 1D:
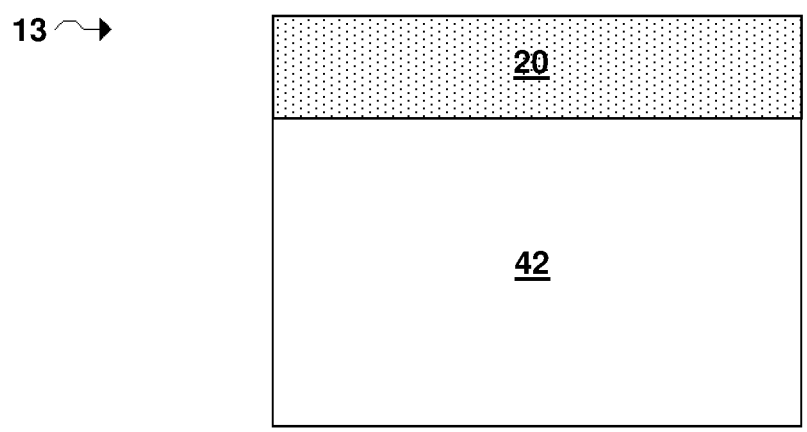
Figure 1E:
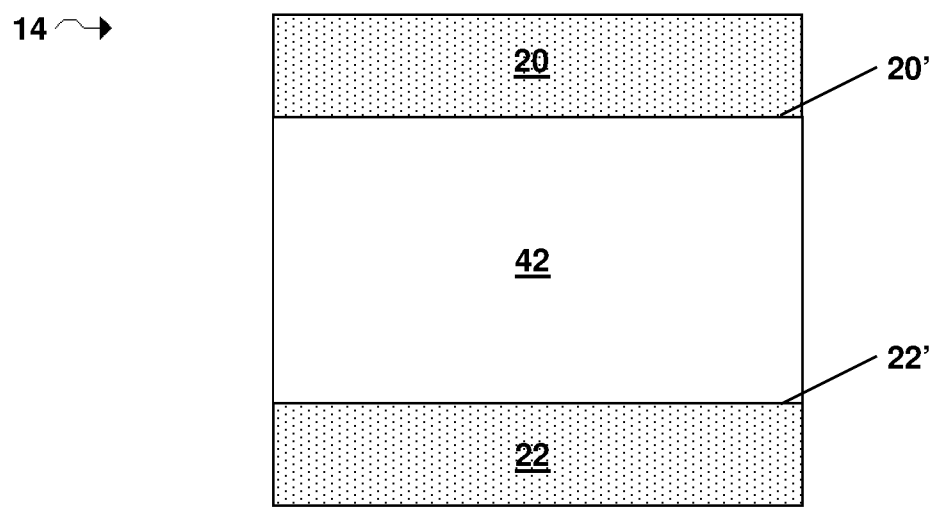

In some cases, the electrolyte is a solid electrolyte layer comprising the ionically conductive compound of formula (I). Referring to FIG. 1D, in some embodiments, article 13 comprises electrode 20 (e.g., an anode or a cathode) and a solid electrolyte 42 in direct contact with electrode 20. In certain embodiments, as illustrated in FIG. 1E, article 14 comprises electrode 20 (e.g., a cathode) and electrode 22 (e.g., an anode) in direct contact with solid electrolyte 42 at a first electrode surface 20' and a second electrode surface 22', respectively. The solid electrolyte may, for example, replace an organic or non-aqueous liquid electrolyte in an electrochemical cell.

Non-limiting examples of other materials that may be suitable for a solid polymer electrolyte include polyethers, polyethylene oxides, polypropylene oxides, polyimides, polyphosphazenes, polyacrylonitriles, polysiloxanes, derivatives of the foregoing, copolymers of the foregoing, cross-linked and network structures of the foregoing, and blends of the foregoing.

A solid electrolyte layer (e.g., a solid electrolyte layer comprising the ionically conductive compound of formula (I)) may have any suitable thickness. For example, in some embodiments, the solid electrolyte layer has a thickness of greater than or equal to 5 nm, greater than or equal to 10 nm, greater than or equal to 20 nm, greater than or equal to 50 nm, greater than or equal to 100 nm, greater than or equal to 200 nm, greater than or equal to 500 nm, greater than or equal to 1 micron, greater than or equal to 5 microns, greater than or equal to 10 microns, greater than or equal to 15 microns, greater than or equal to 20 microns, greater than or equal to 25 microns, greater than or equal to 30 microns, or greater than or equal to 40 microns. In some embodiments, the thickness of the solid electrolyte layer is less than or equal to 50 microns, less than or equal to 40 microns, less than or equal to 30 microns, less than or equal to 20 microns, less than or equal to 10 microns, less than or equal to 5 microns, less than or equal to 1 micron, less than or equal to 500 nm, less than or equal to 200 nm, less than or equal to 100 nm, less than or equal to 50 nm, less than or equal to 20 nm, or less than or equal to 10 nm. Other values are also possible. Combinations of the above-noted ranges are also possible (e.g., greater than or equal to 10 nm and less than or equal to 50 microns, greater than or equal to 10 nm and less than or equal to 1 microns, greater than or equal to 100 nm and less than or equal to 2 microns, greater than or equal to 500 nm and less than or equal to 10 microns, greater than or equal to 1 micron and less than or equal to 25 microns, greater than or equal to 15 microns and less than or equal to 40 microns, greater than or equal to 25 microns and less than or equal to 50 microns).

In some embodiments, an electrode described herein may be a cathode (e.g., a cathode of an electrochemical cell). In some embodiments, an electrode such as a cathode comprises the compound of formula (I). In some embodiments, a layer comprising the compound of formula (I) is deposited on a cathode, as described herein. In certain embodiments, the compound of formula (I) is incorporated into the cathode (e.g., by mixing with a cathode active electrode material prior to the formation of the cathode).

In some embodiments, the electroactive material in the cathode comprises the compound of formula (I). That is, the ionically conductive compound of formula (I) may be the active electrode species of the cathode. In certain embodiments, the compound of formula (I) is a lithium intercalation compound (e.g., a compound that is capable of reversibly inserting lithium ions at lattice sites and/or interstitial sites). In some embodiments, the cathode may be an intercalation electrode comprising the ionically conductive compound of formula (I). In an exemplary embodiment, the cathode comprises $Li_{16}S_{15}MP_2$. In another exemplary embodiment, the cathode comprises $Li_{20}S_{17}MP_2$. In another exemplary embodiment, the cathode comprises $Li_{21}S_{17.5}SiP_2$. In yet another exemplary embodiment, the cathode comprises $Li_{22}S_{18}SiP_2$. In yet another exemplary embodiment, the cathode comprises $Li_{24}S_{19}MP_2$. Incorporation of other ionically conductive compounds in addition to or alternatively to those described above are also possible.

In some embodiments, the electroactive material in the cathode comprising the compound of formula (I) is present in the cathode in an amount of at least about 30 wt %, at least about 40 wt %, at least about 50 wt %, at least about 60 wt %, at least about 70 wt %, at least about 80 wt %, at least about 85 wt %, at least about 90 wt %, at least about 95 wt %, or at least about 98 wt % versus the total cathode weight. In certain embodiments, the electroactive material in the cathode comprising the compound of formula (I) is present in the cathode in an amount of less than or equal to about 100 wt %, less than or equal to about 99 wt %, less than or equal to about 98 wt %, less than or equal to about 95 wt %, less than or equal to about 90 wt %, less than or equal to about 85 wt %, less than or equal to about 80 wt %, less than or equal to about 70 wt %, less than or equal to about 60 wt %, or less than or equal to about 50 wt % versus the total cathode weight. Combinations of the above-referenced ranges are also possible (e.g., at least about 40 wt % and less than or equal to about 95 wt %). Other ranges are also possible.

Additional non-limiting examples of suitable materials that may intercalate ions of an electroactive material (e.g., alkaline metal ions), and which may be included in an electrode (e.g., cathode), include oxides, titanium sulfide, and iron sulfide. Specific examples include $Li_xCoO_2$, $Li_xNiO_2$, $Li_xMnO_2$, $Li_xMn_2O_4$, $Li_xFePO_4$, $Li_xCoPO_4$, $Li_xMnPO_4$, and $Li_xNiPO_4$, where ($0<x\leq 1$), and $LiNi_xMn_yCo_zO_2$ where ($x+y+z=1$).

In some embodiments, active electrode materials for use as cathode active material in the cathode of the electrochemical cells described herein may include, but are not limited to, electroactive transition metal chalcogenides, electroactive conductive polymers, sulfur, carbon, and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In certain embodiments, the cathode may include as an electroactive species elemental sulfur, sulfides, and/or polysulfides.

In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, active electrode materials for use as cathode active materials in electrochemical cells described herein include electroactive sulfur-containing materials (e.g., lithium-sulfur electrochemical cells). "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In certain embodiments, the sulfur-containing material (e.g., in an oxidized form) comprises a polysulfide moiety, $S_m$, selected from the group consisting of covalent $S_m$ moieties, ionic $S_m$ moieties, and ionic $S_{m2-}$ moieties, wherein m is an integer equal to or greater than 3. In some embodiments, m of the polysulfide moiety $S_m$ of the sulfur-containing polymer is an integer equal to or greater than 6 or an integer equal to or greater than 8. In some cases, the sulfur-containing material may be a sulfur-containing polymer. In some embodiments, the sulfur-containing polymer has a polymer backbone chain and the polysulfide moiety $S_m$ is covalently bonded by one or both of its terminal sulfur atoms as a side group to the polymer backbone chain. In certain embodiments, the sulfur-containing polymer has a polymer backbone chain and the polysulfide moiety $S_m$ is incorporated into the polymer backbone chain by covalent bonding of the terminal sulfur atoms of the polysulfide moiety.

In some embodiments, the electroactive sulfur-containing material comprises more than 50% by weight of sulfur. In certain embodiments, the electroactive sulfur-containing material comprises more than 75% by weight of sulfur (e.g., more than 90% by weight of sulfur).

As will be known by those skilled in the art, the nature of the electroactive sulfur-containing materials described herein may vary widely. In some embodiments, the electroactive sulfur-containing material comprises elemental sulfur. In certain embodiments, the electroactive sulfur-containing material comprises a mixture of elemental sulfur and a sulfur-containing polymer.

In certain embodiments, an electrochemical cell as described herein comprises one or more cathodes comprising sulfur as a cathode active material. In some such embodiments, the cathode includes elemental sulfur as a cathode active material. In some embodiments, the compound of formula (I) is chosen such that the compound of formula (I) is different from the anode active material and different from the cathode active material.

As described herein, an electrochemical cell or an article for use in an electrochemical cell may include an electrode (e.g., an anode) comprising an anode active material. In some embodiments, a layer comprising the compound of formula (I) is deposited on an anode. In certain embodiments, the compound of formula (I) is incorporated into the electrode (e.g., by mixing with an active electrode material prior to the formation of the anode).

In some embodiments, the compound of formula (I) is present in the anode in an amount of at least about 40 wt %, at least about 50 wt %, at least about 60 wt %, at least about 70 wt %, at least about 80 wt %, or at least about 85 wt % versus the total anode weight. In certain embodiments, the compound of formula (I) is present in the anode in an amount of less than or equal to about 90 wt %, less than or equal to about 85 wt %, less than or equal to about 80 wt %, less than or equal to about 70 wt %, less than or equal to about 60 wt %, or less than or equal to about 50 wt % versus the total anode weight. Combinations of the above-referenced ranges are also possible (e.g., at least about 40 wt % and less than or equal to about 90 wt %). Other ranges are also possible. In some embodiments, the total anode weight may be measured as the anode active layer itself or the anode active material including any protective layer(s).

Suitable active electrode materials for use as anode active material in the electrochemical cells described herein include, but are not limited to, lithium metal such as lithium foil and lithium deposited onto a conductive substrate, lithium alloys (e.g., lithium-aluminum alloys and lithium-tin alloys), and graphite. Lithium can be contained as one film or as several films, optionally separated by a protective material such as a ceramic material or an ion conductive material described herein. Suitable ceramic materials include silica, alumina, or lithium containing glassy materials such as lithium phosphates, lithium aluminates, lithium silicates, lithium phosphorous oxynitrides, lithium tantalum oxide, lithium aluminosulfides, lithium titanium oxides, lithium silcosulfides, lithium germanosulfides, lithium aluminosulfides, lithium borosulfides, and lithium phosphosulfides, and combinations of two or more of the preceding. Suitable lithium alloys for use in the embodiments described herein can include alloys of lithium and aluminum, magnesium, silicium (silicon), indium, and/or tin. While these materials may be preferred in some embodiments, other cell chemistries are also contemplated. For instance, in some embodiments, certain electrodes (e.g., anodes) may include other alkali metals (e.g., group 1 atoms) in some instances. In some embodiments, the anode may comprise one or more binder materials (e.g., polymers, etc.).

In other embodiments, a silicon-containing or silicon-based anode may be used.

In some embodiments, the thickness of the anode may vary from, e.g., 2 to 200 microns. For instance, the anode may have a thickness of less than 200 microns, less than 100 microns, less than 50 microns, less than 25 microns, less than 10 microns, or less than 5 microns. In certain embodiments, the anode may have a thickness of greater than or equal to 2 microns, greater than or equal to 5 microns, greater than or equal to 10 microns, greater than or equal to 25 microns, greater than or equal to 50 microns, greater than or equal to 100 microns, or greater than or equal to 150 microns. Combinations of the above-referenced ranges are also possible (e.g., greater than or equal to 2 microns and less than or equal to 200 microns, greater than or equal to 2 microns and less than or equal to 100 microns, greater than or equal to 5 microns and less than or equal to 50 microns, greater than or equal to 5 microns and less than or equal to 25 microns, greater than or equal to 10 microns and less than or equal to 25 microns). Other ranges are also possible. The choice of the thickness may depend on cell design parameters such as the excess amount of lithium desired, cycle life, and the thickness of the cathode electrode.

In some embodiments, an electrochemical cell described herein comprises at least one current collector. Materials for the current collector may be selected, in some cases, from metals (e.g., copper, nickel, aluminum, passivated metals, and other appropriate metals), metallized polymers, electrically conductive polymers, polymers comprising conductive particles dispersed therein, and other appropriate materials. In certain embodiments, the current collector is deposited onto the electrode layer using physical vapor deposition, chemical vapor deposition, electrochemical deposition, sputtering, doctor blading, flash evaporation, or any other appropriate deposition technique for the selected material. In some cases, the current collector may be formed separately and bonded to the electrode structure. It should be appreciated, however, that in some embodiments a current collector separate from the electroactive layer may not be present or needed.

In some embodiments, an electrochemical cell comprises a lithium or silicon based anode, a cathode (e.g., a cathode comprising electroactive sulfur-containing material, an intercalation cathode) and a solid electrolyte layer comprising the compound of formula (I). The electrochemical cell may include other components as described herein.

In certain embodiments, an electrochemical cell comprises a lithium or silicon based anode, a cathode (e.g., a cathode comprising electroactive sulfur-containing material, an intercalation cathode), a liquid electrolyte, and a protective layer comprising the compound of formula (I). The electrochemical cell may include other components as described herein.

In some embodiments, an electrochemical cell comprises a lithium or silicon based anode, a cathode (e.g., a cathode comprising electroactive sulfur-containing material, an intercalation cathode), a liquid electrolyte, and a separator comprising the compound of formula (I). The electrochemical cell may include other components as described herein.

In certain embodiments, an electrochemical cell comprises a lithium or silicon based anode, an intercalated cathode (e.g., a cathode comprising the compound of formula (I) as an intercalation species), and an electrolyte (e.g., a liquid electrolyte). The electrochemical cell may include other components as described herein.

The following examples are intended to illustrate certain embodiments of the present invention, but do not exemplify the full scope of the invention.

Example 1

This example describes the conductivity and composition of various ionically conductive compounds having the formula as in Formula (I): $Li_{2x}S_{x+w+5z}M_yP_{2z}$, where x is 5-14, y and z are 0.5-1, w is y, 1.5y, or 2y, and M is Si. A comparative compound, $Li_{2x}S_{x+7}GeP_2$, was also formed.

Ionically conductive compounds were formed by mixing of $Li_2S$, $SiS_2$ (or $GeS_2$), $P_2S_5$ or using different precursors like $Li_2S$, Si (or Ge), $S_8$, $P_2S_5$, or $Li_2S$, Si, $S_8$, P according to stoichiometry to form the compounds as listed in Table 1. The mixtures were mixed by ball milling. The mixtures were sealed in a closed vessel under inert atmosphere (e.g., Argon) and heated to 700° C. for between 12-16 hours. The vessels were then cooled to room temperature and the materials were ground into powder form.

Figure 2:
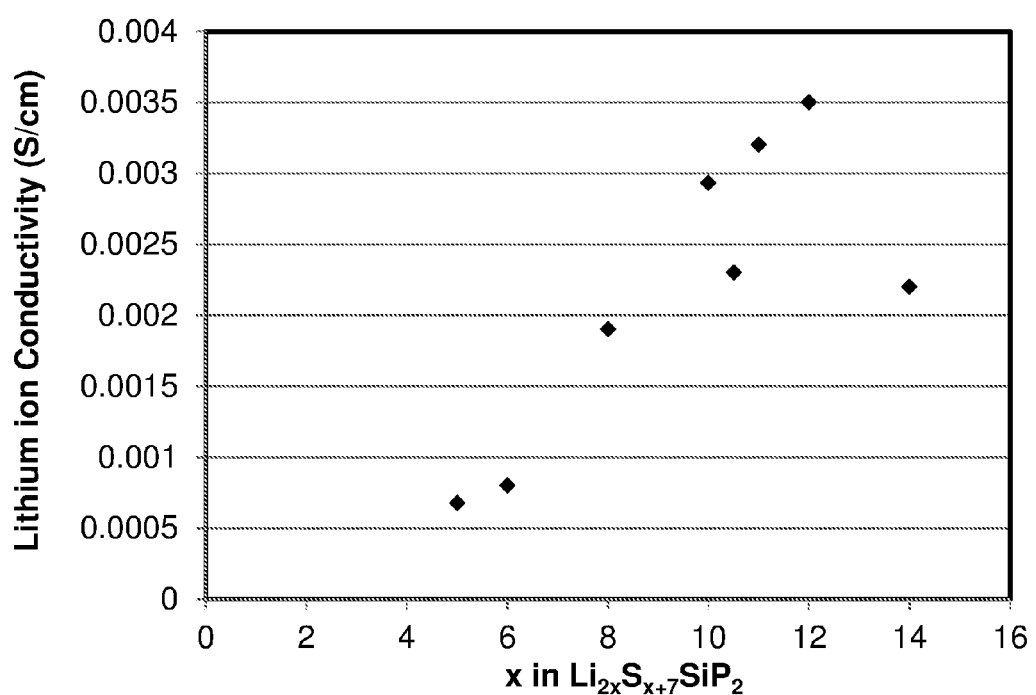
FIG. 2 is a plot of conductivity (in S/cm) as a function of x for a compound having a formula as in $Li_{2x}S_{x+7}SiP_2$, according to some embodiments.

FIG. 2 shows the conductivity of particles of ionically conductive compounds having the formula $Li_{2x}S_{x+7}SiP_2$ and is summarized in Table 1. Table 1 also includes particles of comparative compound, $Li_{24}GeP_2S_{19}$. The average ionic conductivity was measured by pressing the particles between two copper cylinders at a pressure of up to 4 tons/cm², and determining the conductivity using a conductivity bridge operating at 1 kHz at 25° C., at 500 kg/cm² increments of pressure until changes in average ion conductivity were no longer observed in the sample.

TABLE 1

| | x | [S/cm] |
|---|---|---|
| $Li_{10}S_{12}SiP_2$ | 5 | $6.76 \times 10^{-4}$ |
| $Li_{12}S_{13}SiP_2$ | 6 | $8.0 \times 10^{-4}$ |
| $Li_{16}S_{15}SiP_2$ | 8 | $1.9 \times 10^{-3}$ |
| $Li_{20}S_{17}SiP_2$ | 10 | $2.93 \times 10^{-3}$ |
| $Li_{21}S_{17}Si_2P$ | 10.5 | $2 \times 10^{-3}$ |
| $Li_{21}S_{17.5}SiP_2$ | 10.5 | $2.30 \times 10^{-3}$ |
| $Li_{22}S_{18}SiP_2$ | 11 | $3.2 \times 10^{-3}$ |
| $Li_{24}S_{19}SiP_2$ | 12 | $2.83 \times 10^{-3}$ |
| $Li_{28}S_{21}SiP_2$ | 14 | $2.2 \times 10^{-3}$ |
| $Li_{24}S_{19}GeP_2$ | 12 | $3.1 \times 10^{-3}$ |

Figure 3:
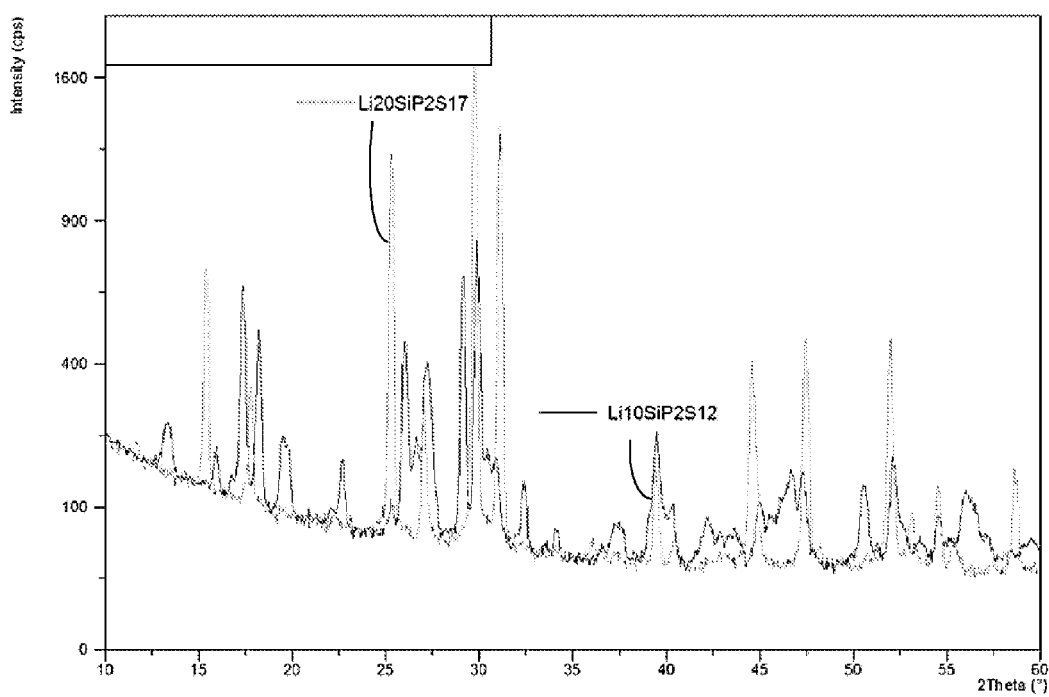
FIG. 3 is an XRD spectral plot of $Li_{10}S_{12}SiP_2$ and $Li_{20}S_{17}SiP_2$, according to one set of embodiments.
Figure 4:
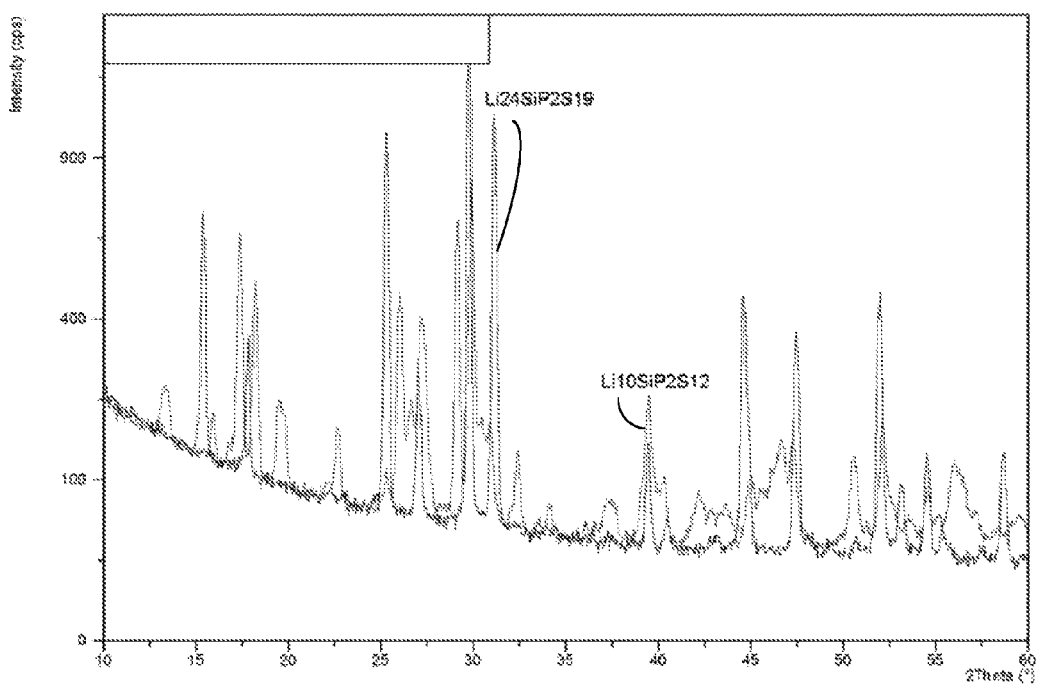
FIG. 4 is an XRD spectral plot of $Li_{10}S_{12}SiP_2$ and $Li_{24}S_{19}SiP_2$, according to one set of embodiments.

The XRD patterns indicate that the particles of $Li_{20}SiP_2S_{17}$ (FIG. 3) and $Li_{24}SiP_2S_{19}$ (FIG. 4) particles have different structures from that of $Li_{10}SnP_2S_{12}$ particles. $Li_{20}SiP_2S_{17}$ and $Li_{24}SiP_2S_{19}$ had similar XRD patterns, which showed much less pronounced satellite peaks, suggesting that these structures have higher ordering (e.g., each having a cubic lattice) and higher degree of crystallinity within the structure, compared to those reported for $Li_{10}SnP_2S_{12}$ and $Li_{10}GeP_2S_{12}$. Furthermore, negligible features of $Li_2S$ (e.g., standard peak positions for $Li_2S$) appear in each of the spectra, indicating that a chemical reaction occurred (and not, for example, a mere mechanical mixture of the starting compounds).

Example 2

This example demonstrates the stability of the ionically conductive compound $Li_{20}SiP_2S_{17}$ in the presence of an electrolyte.

Figure 5:
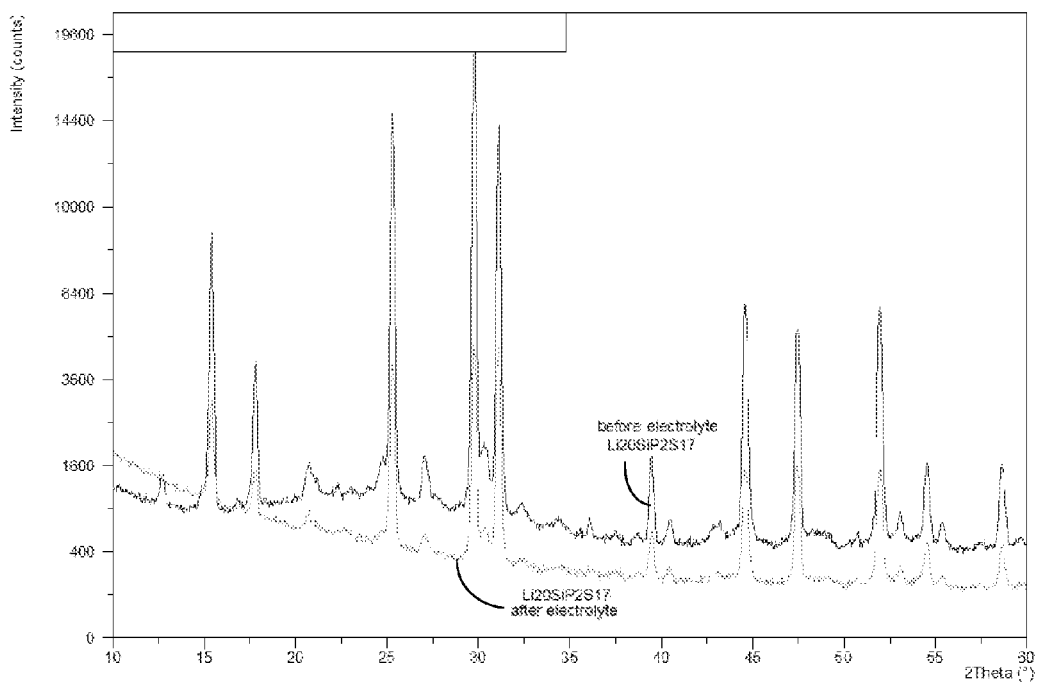
FIG. 5 is an XRD spectral plot of $Li_{20}S_{17}SiP_2$ before and after electrolyte exposure, according to one set of embodiments.

FIG. 5 shows XRD patterns from particles of $Li_{20}SiP_2S_{17}$ before and after soaking in an LP30 electrolyte (IM of $LiPF_6$ in a 1:1 ratio of ethyl carbonate and dimethyl carbonate) for 3 weeks at 40° C. The XRD patterns demonstrate very similar structure before and after the electrolyte soak.

Example 3

This example demonstrates the stability of lithium in the presence of the ionically conductive compounds described herein.

Stability in the present of lithium was tested using sandwich structures in which a pellet of particles of an ionically-conductive compound (e.g., $Li_{10}SiP_2S_{12}$, $Li_{20}SiP_2S_{17}$ or $Li_{24}SiP_2S_{19}$, e.g., between 0.5 to 2 mm in average thickness) was placed between two lithium metal foils.

In a sandwich structure, $Li/Li_{10}SiP_2S_{12}/Li$, the lithium metal was consumed over time, which indicated that the material was not stable against lithium metal. Structures incorporating $Li_{20}SiP_2S_{17}$ or $Li_{24}SiP_2S_{19}$, such as $Li/Li_{20}SiP_2S_{17}/Li$ and $Li/Li_{24}SiP_2S_{19}/Li$ respectively, demonstrated an improved stability next to lithium metal compared to $Li_{10}SiP_2S_{12}$. Stability was also confirmed qualitatively by opening the structures (e.g., $Li/Li_{10}SiP_2S_{12}/Li$) and observing changes in the pellet layer.

Example 4

This example describes the conductivity and structure of an ionically conductive compound having the formula $Li_{21}S_{17}GaP_2$ (i.e., Formula (I): $Li_{2x}S_{x+w+5z}M_yP_{2z}$, where x is 10.5, y is 1, w is 1.5y, z is 1, and M is Ga).

An ionically conductive compound was formed by mixing $Li_2S$, $GaS_2$, and $P_2S_5$. The mixture was mixed by ball milling. The mixture was sealed in a closed vessel under inert atmosphere (e.g., Argon) and heated to 700° C. for between 12-16 hours. The vessel was then cooled to room temperature and the material was ground into powder form to form $Li_{21}S_{17}GaP_2$.

The average ionic conductivity of $Li_{21}S_{17}GaP_2$ was $1.4 \times 10^{-4}$ S/cm. The average ionic conductivity was measured by pressing the particles between two copper cylinders at a pressure of up to 4 tons/cm², and determining the conductivity using a conductivity bridge operating at 1 kHz at 25° C., at 500 kg/cm² increments of pressure until changes in average ion conductivity were no longer observed in the sample.

Example 5

This example demonstrates the stability of the ionically conductive compound $Li_{22}SiP_2S_{18}$ in the presence of an electrolyte.

Figure 6:
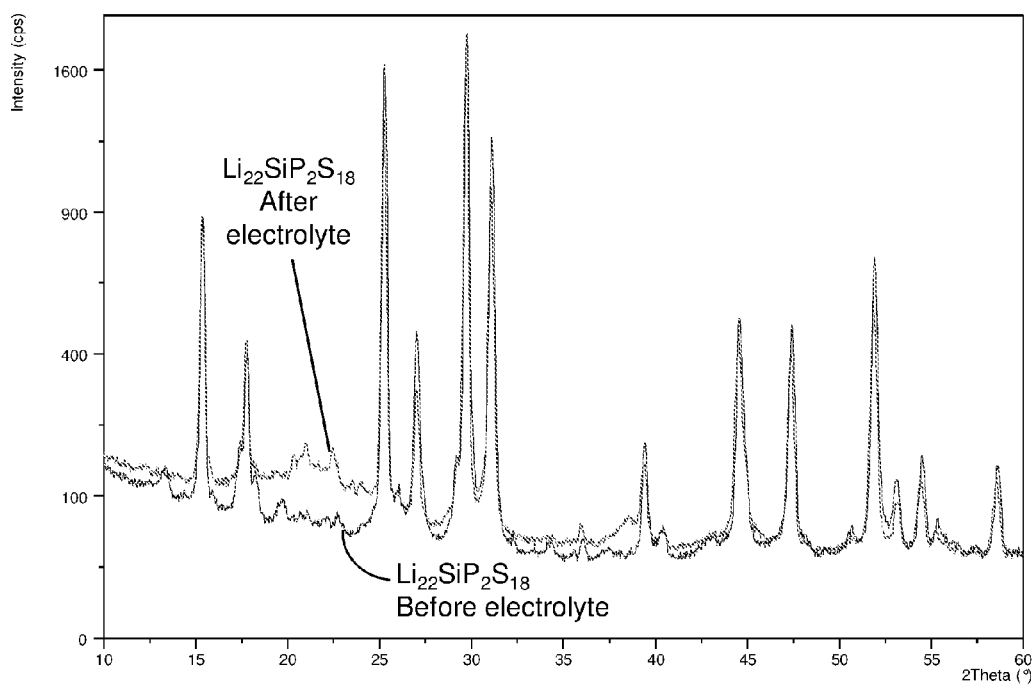
FIG. 6 is an XRD spectral plot of $Li_{22}SiP_2S_{18}$ before and after electrolyte exposure, according to one set of embodiments.

FIG. 6 shows XRD patterns from particles of $Li_{22}SiP_2S_{18}$ before and after soaking in an organic liquid carbonate-based electrolyte for 2 weeks at 40° C. The XRD patterns demonstrate very similar structures before and after the electrolyte soak, showing that the compound is stable in this electrolyte.

Comparative Example 5

This example demonstrates the stability of the ionically conductive compound $Li_{18}P_3S_{15}Br_3$ in the presence of an electrolyte.

Figure 7:
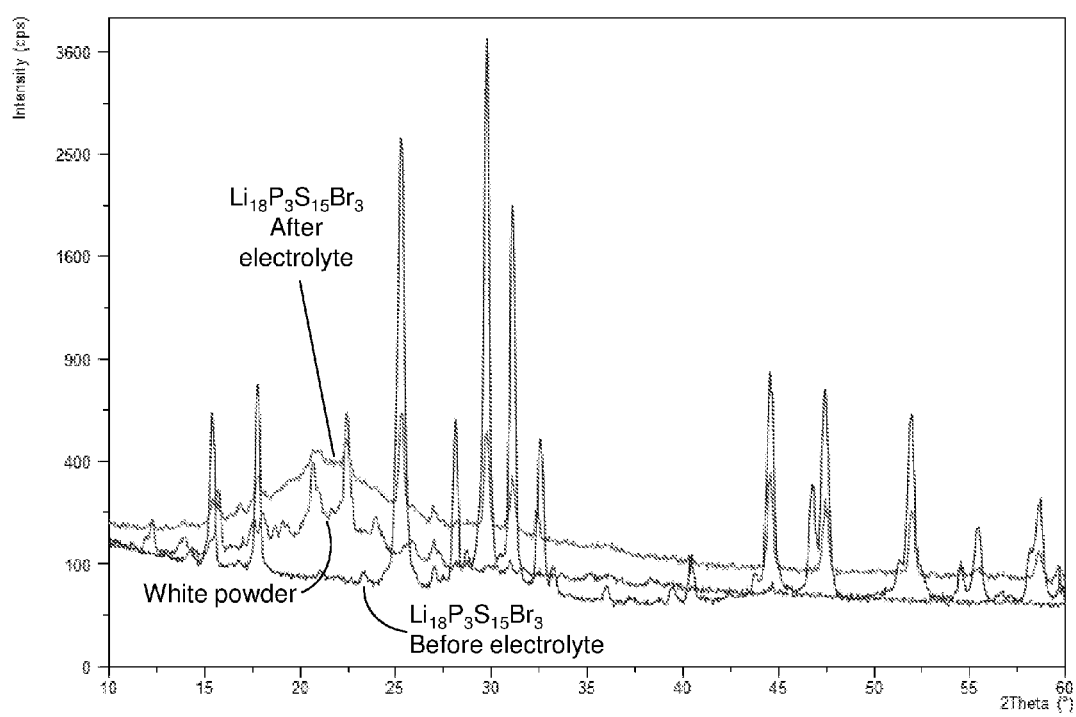
FIG. 7 is an XRD spectral plot of $Li_{18}P_3S_{15}Br_3$ before and after electrolyte exposure, according to one set of embodiments.

FIG. 7 shows XRD patterns from particles of $Li_{18}P_3S_{15}Br_3$ before and after soaking in an organic liquid carbonate-based electrolyte for 2 weeks at 40° C. A white thick powder formed around the particles. The XRD patterns and white powder suggest that the $Li_{18}P_3S_{15}Br_3$ particles reacted with the electrolyte.

Example 6

This example describes the conductivity and composition of various ionically conductive compounds having the formula $Li_{2x}S_{x+w+5z}M_yP_{2z}$, where x is 5.5-10.5, y and z are 0.5-2, w is y, 1.5y, or 2y, and M is Si, Al, La, B, and/or Ga.

A comparative compound having the formula $Li_{21}AlSi_2S_{16}$ (substituting Al for P), was also created.

Ionically conductive compounds were formed by mixing of $Li_2S$, $SiS_2$, $P_2S_5$, and/or using different precursors like $Li_2S$, Si (or Al, La, B, and/or Ga), $S_8$, $P_2S_5$, or $Li_2S$, Si, $S_8$, P according to stoichiometry to form the compounds as listed in Table 2. The mixtures were mixed by ball milling. The mixtures were sealed in a closed vessel under an inert atmosphere (e.g., argon) and heated to 500° C. or 700° C., as noted, for between 12-16 hours. The vessels were then cooled to room temperature and the materials were ground into powder form.

The conductivity of particles of ionically conductive compounds having the formula $Li_{2x}S_{x+w+5z}M_yP_{2z}$, is summarized in Table 2. The average ionic conductivity was measured by pressing the particles between two copper cylinders at a pressure of up to 4 tons/cm², and determining the conductivity using a conductivity bridge operating at 1 kHz at 25° C., at 500 kg/cm² increments of pressure until changes in average ion conductivity were no longer observed in the sample.

TABLE 2

| | Synthesis Temperature (° C.) | Conductivity [mS/cm] |
|---|---|---|
| $Li_{21}SiP_2S_{17.5}$ | 700 | 2.5 |
| $Li_{21}La_{0.5}Si_{1.5}PS_{16.75}$ | 700 | 2.1 |
| $Li_{21}LaSiPS_{16.5}$ | 700 | 1.0 |
| $Li_{21}La_2PS_{16}$ | 700 | 0.0011 |
| $Li_{21}AlP_2S_{17}$ | 700 | 0.0029 |
| $Li_{17}AlP_2S_{15}$ | 700 | 0.0039 |
| $Li_{17}Al_2PS_{14}$ | 700 | 0.0031 |
| $Li_{11}AlP_2S_{12}$ | 700 | 0.0026 |
| $Li_{11}AlP_2S_{12}$ | 500 | 0.13 |
| $Li_{21}AlSiPS_{16.5}$ | 700 | 0.57 |
| $Li_{21}Al_{0.5}Si_{1.5}PS_{16.75}$ | 700 | 0.71 |
| $Li_{21}AlSi_2S_{16}$ | 700 | 0.03 |
| $Li_{21}BP_2S_{17}$ | 700 | 0.094 |
| $Li_{21}GaP_2S_{17}$ | 700 | 0.14 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article for use in an electrochemical cell, comprising:
a compound of formula (I):

$$Li_{2x}S_{x+w+5z}M_yP_{2z} \qquad (I)$$

wherein:
M is selected from the group consisting of Lanthanides, Group 3, Group 4, Group 5, Group 6, Group 7, Group 8, Group 9, Group 12, Group 13, and Group 14 atoms, and combinations thereof;
x is 8-16,
y is 1,
w is 0.1-15, and
z is 0.1-3.

2. An article as in claim 1, comprising a layer comprising the compound of formula (I).

3. An article as in claim 2, wherein the layer comprising the compound of formula (I) is in direct contact with an electrode.

4. An article as in claim 2, wherein the layer comprising the compound of formula (I) is a separator.

5. An article as in claim 4, wherein the layer comprising the compound of formula (I) has an average thickness of greater than or equal to 1 microns and less than or equal to 50 microns.

6. An article as in claim 2, wherein the layer comprising the compound of formula (I) is a protective layer.

7. An article as in claim 6, wherein the layer comprising the compound of formula (I) has an average thickness of greater than or equal to 1 nanometer and less than or equal to 10 microns.

8. An article as in claim 2, wherein the layer comprising the compound of formula (I) is a solid electrolyte layer.

9. An article as in claim 8, wherein the layer comprising the compound of formula (I) has an average thickness of greater than or equal to 50 nm and less than or equal to 25 microns.

10. An article as in claim 2, wherein the layer comprising the compound of formula (I) is a lithium-intercalation electrode.

11. An article as in claim 10, wherein the layer comprising the compound of formula (I) has an average ion conductivity of greater than or equal to $10^{-4}$ S/cm.

12. An article as in claim 2, wherein the layer comprising the compound of formula (I) is greater than or equal to 50 wt. % and less than or equal to 99 wt. % crystalline.

13. An article as in claim 2, wherein the crystalline fraction of the compound of formula (I) comprised by the layer is in the range of from 50 to 100 wt. %, based on the total weight of the compound of formula (I) comprised by the layer.

14. An article as in claim 1, comprising the compound of formula (I) deposited on a layer.

15. An article as in claim 1, wherein x is 10 or greater.

16. An article as in claim 1, wherein the compound of formula (I) is crystalline.

17. An article as in claim 1, wherein the compound of formula (I) is amorphous.

18. A compound of formula (I):

$$Li_{2x}S_{x+w+5z}M_yP_{2z} \qquad (I)$$

wherein:
M is selected from the group consisting of Lanthanides, Group 3, Group 4, Group 5, Group 6, Group 7, Group 8, Group 9, Group 12, Group 13, and Group 14 atoms, and combinations thereof,
x is 8-16,
y is 1,
w is 0.1-15, and
z is 0.1-3.

19. A method for forming a plurality of particles, comprising:
heating a mixture of precursors comprising atoms of the elements Li, S, P, and M to a temperature ranging from 400° C. to 900° C. for a duration ranging from 3 hours to 24 hours;
cooling the mixture; and
forming a plurality of particles comprising a compound of formula (I):

$$Li_{2x}S_{x+w+5z}M_yP_{2z} \qquad (I),$$

wherein:
M is selected from the group consisting of Lanthanides, Group 3, Group 4, Group 5, Group 6, Group 7, Group 8, Group 9, Group 12, Group 13, and Group 14 atoms, and combinations thereof;
x is 8-16,
y is 1,
w is 0.1-15, and
z is 0.1-3.

* * * * *